United States Patent
Urano et al.

(10) Patent No.: US 6,471,126 B2
(45) Date of Patent: *Oct. 29, 2002

(54) METHOD AND APPARATUS FOR READING INVISIBLE SYMBOL

(75) Inventors: Taeko I. Urano, Kawasaki; Kenji Sano, Tokyo; Hideo Nagai, Nagareyama; Tomokazu Domon, Yokosuka; Hironori Fukuda, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 80 days.

This patent is subject to a terminal disclaimer.

(21) Appl. No.: 09/753,763

(22) Filed: Jan. 2, 2001

(65) Prior Publication Data

US 2001/0020677 A1 Sep. 13, 2001

Related U.S. Application Data

(63) Continuation of application No. 09/273,276, filed on Mar. 22, 1999, now Pat. No. 6,168,081.

(30) Foreign Application Priority Data

Mar. 23, 1998 (JP) .......................................... 10-074545
Dec. 25, 1998 (JP) .......................................... 10-370759

(51) Int. Cl.[7] ................................................ G06K 7/10
(52) U.S. Cl. .......................... 235/462.27; 235/462.05; 235/468
(58) Field of Search ...................... 235/462.05, 462.08, 235/462.25, 462.27, 468, 491, 494

(56) References Cited

U.S. PATENT DOCUMENTS

| 4,436,991 A | * | 3/1984 | Albert et al. | 235/462.27 |
|---|---|---|---|---|
| 4,983,817 A | * | 1/1991 | Dolash et al. | 235/462.27 |
| 5,294,198 A | | 3/1994 | Schlagheck | 374/4 |
| 5,942,742 A | * | 8/1999 | Suhara | 235/462.14 |
| 5,971,276 A | * | 10/1999 | Sano et al. | 235/462.01 |
| 6,168,081 B1 | * | 1/2001 | Urano et al. | 235/462.27 |

FOREIGN PATENT DOCUMENTS

JP          7-282184           10/1995

* cited by examiner

Primary Examiner—Michael G. Lee
Assistant Examiner—Daniel St. Cyr
(74) Attorney, Agent, or Firm—Oblon, Spivak, McClelland, Maier & Neustadt, P.C.

(57) ABSTRACT

An invisible symbol reading apparatus includes a heating unit for heating an invisible symbol formed on a sample and containing a material which emits infrared light when heated, a detecting unit for detecting infrared light emitted from the invisible symbol, and an arithmetic operation unit for binarizing a detection signal from the detecting unit. The arithmetic operation unit calculates a differential coefficient of the detection signal, that corresponds to a position on the sample. On the basis of upper and lower threshold values set for the differential coefficient, the arithmetic operation unit determines a maximum value of the differential coefficient in a region exceeding the upper threshold value and a minimum value of the differential coefficient in a region smaller than the lower threshold value. The arithmetic operation unit binarizes the detection signal by using the maximum or minimum value as a leading or trailing edge of a binary function.

22 Claims, 12 Drawing Sheets

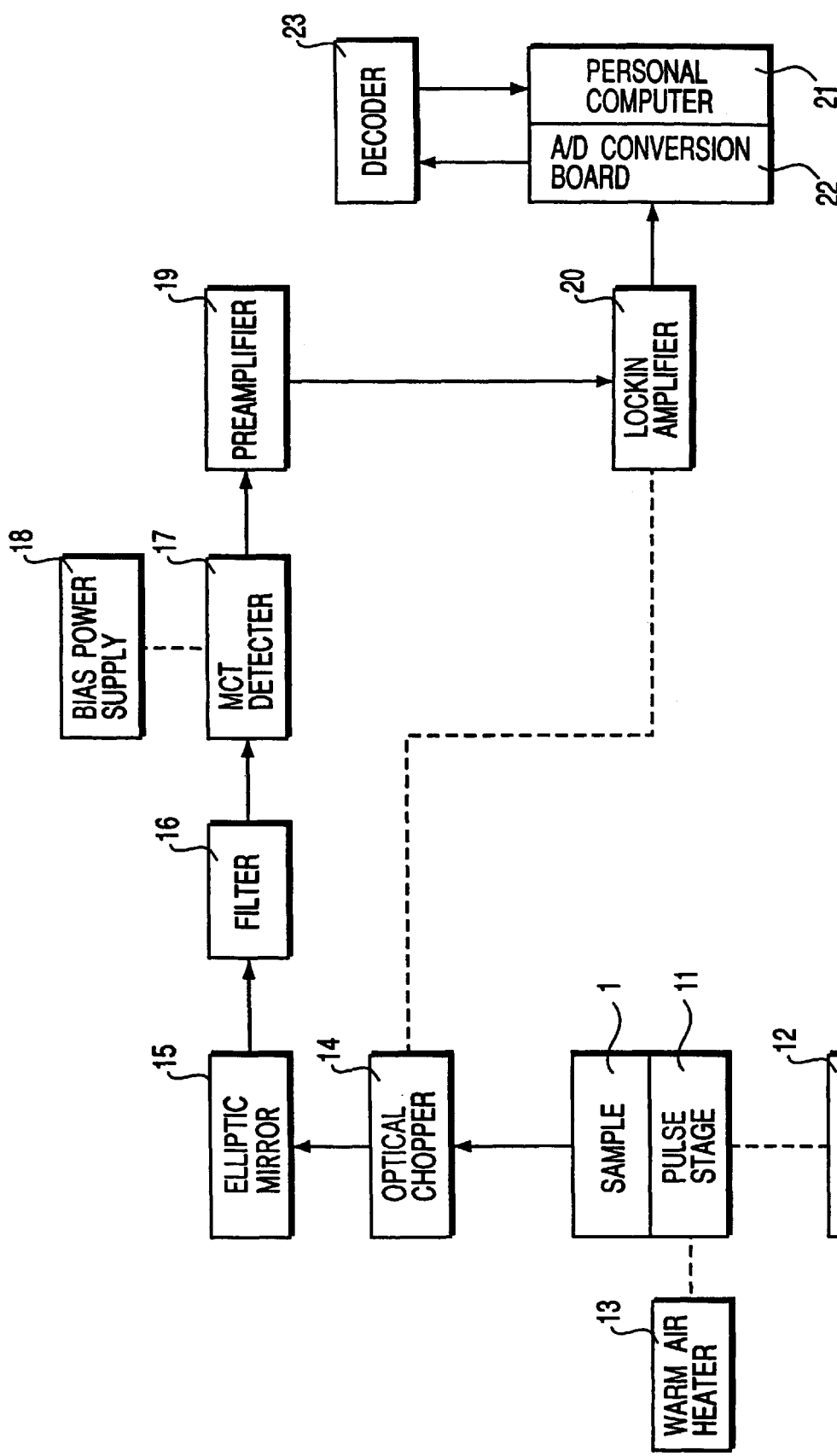
F I G. 1

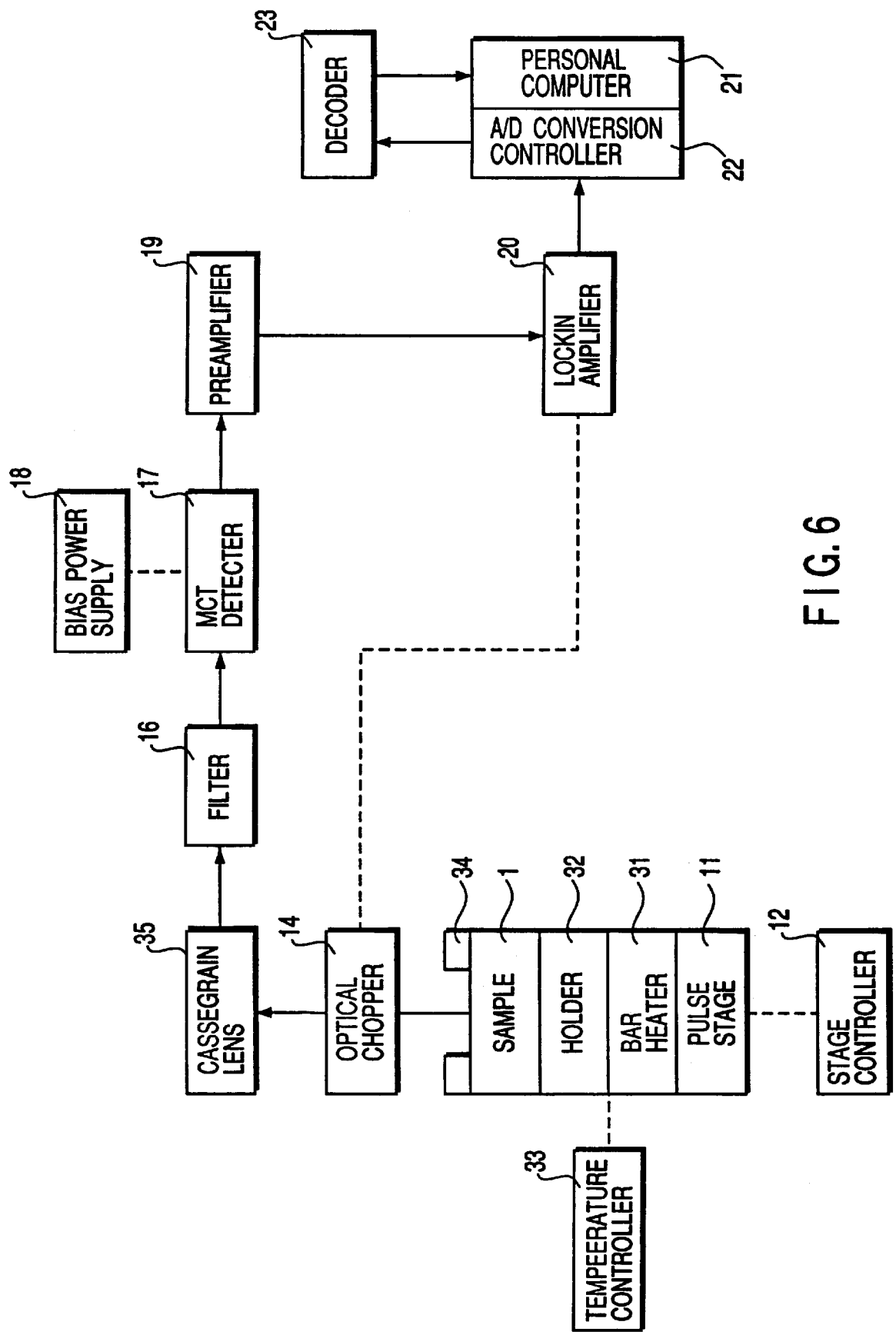
F I G. 6

METHOD AND APPARATUS FOR READING INVISIBLE SYMBOL

This application is a continuation of U.S. application Ser. No. 09/273,276, filed Mar. 22, 1999, now U.S. Pat. No. 6,168,081.

BACKGROUND OF THE INVENTION

The present invention relates to a method and apparatus for reading invisible symbols (linear barcodes and two-dimensional symbols) usable in mail service, distribution of articles whose appearances are important, management of documents and articles requiring secrecy, and prevention of forgery.

Barcodes or two-dimensional symbols representing information about a manufacturing country, manufacturer, and product items are printed or pasted as labels on many articles currently distributed on the market. When an operator uses an optical reader to read a barcode, a corresponding price is read out from a database. This greatly reduces the working time compared to conventional work in which an operator inputs a price into a register. Stock control is also made efficient by constructing a POS system. Additionally, barcodes are effective to increase the efficiency of express delivery.

On the other hand, barcodes cannot be attached to some articles, and it is better not to attach barcodes to some articles presently having barcodes. For example, a printed barcode spoils the appearance of a book. This problem of appearance can be solved if an invisible or stealth barcode can be attached to an article. A tag or barcode is presently attached to the inside of a linen supply or clothing item where this tag or barcode is difficult to see. However, the work of distribution can be rationalized if an invisible barcode can be attached to the front surface of a packaged article.

In mail service, zip codes are read by an OCR to process a large amount of mails within a short time. However, this zip code reading is time-consuming and requires manual sorting of mails because read errors sometimes occur. Although barcodes may be used in mail service, visible barcodes cannot be printed on the surfaces of mails because the barcodes contaminate the mails. If information such as a zip code can be printed as an invisible barcode as in the above case, the time of sorting can be greatly reduced, and this allows rapid delivery of mails.

A barcode can contain much information in a narrow space. However, a barcode itself cannot unlimitedly shrink, so a fixed exclusive area is necessary. This exclusive area is not negligible if the size of an article is small. However, an invisible barcode can be superposed on some other printed information and hence does not require any exclusive area.

As a method of preventing forgery, invisible barcodes can be combined with another forgery preventing method. This may improve the effect of preventing forgery. As described above, invisible barcodes can extend the range of application of barcodes.

Two kinds of invisible barcode methods are presently possible: in one method a barcode is read by ultraviolet light, and in the other method a barcode is read by infrared light. In the method using ultraviolet light, a barcode is formed by using a fluorescent dye which does not absorb visible light. This fluorescent dye is excited by ultraviolet light, and fluorescence whose wavelength is different from that of the excitation light is detected. In the method using infrared light, a barcode is formed by using a metal complex which does not absorb visible light. This metal complex is excited by infrared light, and fluorescence whose wavelength is different from that of the excitation light is detected ("Stealth Barcodes", Tsunemi Ooiwa, OplusE, No. 213, p. 83, 1997).

Unfortunately, the ultraviolet light method has the following problem. That is, fluorescent dyes are often added to paper and cloth for bleaching purposes, and these fluorescent dyes also emit fluorescence. Since interaction with ultraviolet light is transition between electronic states of molecules, fluorescence less depends upon the intrinsic nature of a substance. Therefore, it is highly likely that reading of fluorescence emitted from an invisible barcode is interfered with. Also, a fluorescent dye in the ultraviolet region readily causes photo-deterioration, so it is highly possible that no predetermined fluorescence intensity can be obtained after a long-time use or storage. For these reasons, the reading accuracy largely declines easily.

Additionally, both fluorescent dyes and metal complexes have problems in toxicity and waste disposal. That is, barcodes are brought into homes together with commodities, and some barcodes remain existing in the living environment for long time periods. Therefore, babies and little children may lick these barcodes by mistake, or toxic low-concentration exposure to barcodes may occur. When these possibilities are taken into consideration, it is necessary to select materials from compounds already found to be safe. Furthermore, when recent waste disposal regulations are taken into consideration, it is desirable to select materials by taking account of even recycling and final disposal. In these respects, it is preferable to avoid the use of fluorescent dyes and metal complexes.

To prevent forgery, it is important that both a reader and an invisible barcode material be difficult to obtain. When an ultraviolet fluorescent dye is used, a light source for emitting ultraviolet light is readily available. Fluorescence in the visible light region can, of course, be visually checked. Fluorescence in the ultraviolet region is also easy to visually check by inputting the fluorescence into another material. Additionally, fluorescence less depends upon the intrinsic nature of a substance, so a substance which emits fluorescence similar to that of a visible barcode material is readily obtainable. On the other hand, in the infrared light method using a metal complex, an LED for the near infrared region can be used as a light source, and fluorescence can be detected by a CCD camera. Additionally, a similar fluorescent material can be easily obtained as in the case of a fluorescent material in the ultraviolet region.

As described above, an invisible barcode presently has many problems although it is expected as a technology meeting various needs.

BRIEF SUMMARY OF THE INVENTION

It is an object of the present invention to provide a method and apparatus capable of reading invisible symbols with high reading accuracy.

A method for reading an invisible symbol of the present invention comprises the steps of heating an invisible symbol formed on a sample and containing a material which emits infrared light when heated, detecting infrared light emitted from the invisible symbol, calculating a differential coefficient of a detection signal corresponding to a position on the sample, determining, on the basis of upper and lower threshold values set for the differential coefficient, a maximum value of the differential coefficient in a region exceeding the upper threshold value and a minimum value of the differential coefficient in a region smaller than the lower threshold value, and binarizing the detection signal by using the maximum or minimum value as a leading or trailing edge of a binary function.

In the method of the present invention, it is also possible to heat the sample and detect infrared light emitted from the invisible symbol in a process of cooling the sample.

An apparatus for reading an invisible symbol of the present invention comprises heating means for heating an invisible symbol formed on a sample and containing a material which emits infrared light when heated, detecting means for detecting infrared light emitted from the invisible symbol, and an arithmetic operation unit for binarizing a detection signal from the detecting means. The arithmetic operation unit calculates a differential coefficient of a detection signal corresponding to a position on the sample, determines, on the basis of upper and lower threshold values set for the differential coefficient, a maximum value of the differential coefficient in a region exceeding the upper threshold value and a minimum value of the differential coefficient in a region smaller than the lower threshold value, and binarizes the maximum or minimum value as a leading or trailing edge of a binary function.

The apparatus of the present invention can further comprise means for moving the sample from a heating position of the heating means to a detection position of the detecting means, and control means for turning off the heating means heating the sample before detection by the detecting means. When these means are provided, infrared light emitted from the invisible symbol can be detected in a process of cooling the sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an invisible symbol reading apparatus of Example 1;

FIG. 6 is a block diagram showing an invisible symbol reading apparatus of Example 2;

DETAILED DESCRIPTION OF THE INVENTION

Figure 2:
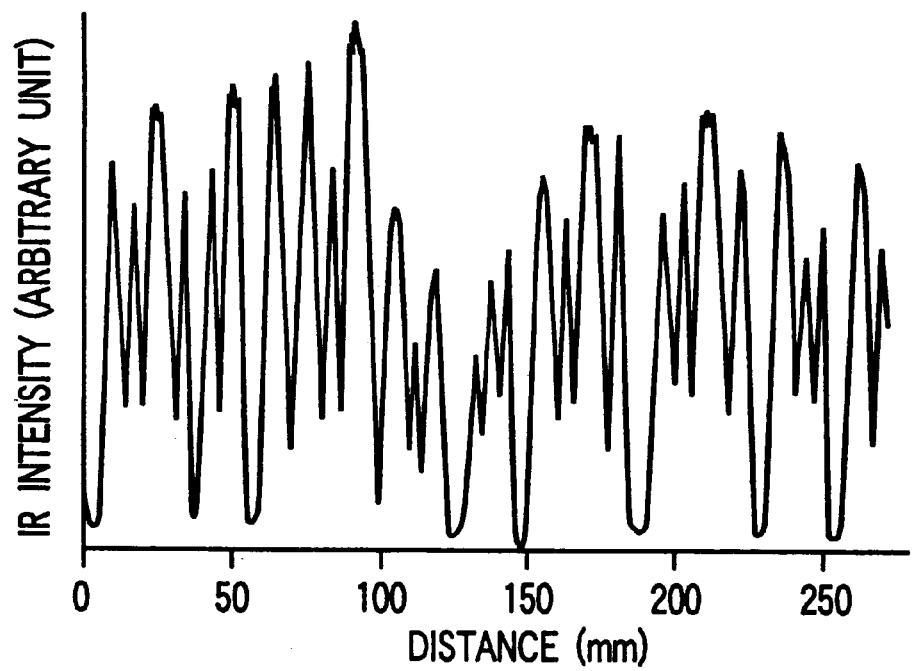
FIG. 2 is a graph showing the intensity of infrared light emitted from an invisible symbol measured in Example 1.

The present invention will be described in more detail below.

In the present invention, symbols mean linear (one-dimensional) barcodes and two-dimensional symbols. Reading of a barcode as a representative symbol will be principally described below.

The principle of the present invention is to use infrared light emitted from an invisible barcode as reading light. Every molecule has absorption in the infrared region as interaction with its molecular vibration. Therefore, every molecule absorbs infrared light having a wavelength intrinsic to its molecular structure and state and emits infrared light. That is, the wavelength of infrared light as a result of interaction changes in accordance with the molecular structure or state of a molecule. Accordingly, the influence of an interfering substance can be suppressed by using a material not used in a sample (an article to which a barcode is attached) as the material of the barcode. Additionally, a material containing neither metals nor halogens and found to be safe both when in use and wasted can be chosen as the material of a barcode. When a barcode is to be read with infrared light, the energy per photon is smaller than that of ultraviolet light or visible light, so the operation is readily influenced by ambient heat. By contrast, the present invention can effectively remove ambient thermal noise.

That is, an invisible symbol reading method of the present invention comprises the steps of heating an invisible symbol formed on a sample and containing a material which emits infrared light when heated, detecting infrared light emitted from the invisible symbol, calculating a differential coefficient of a detection signal corresponding to a position on the sample, determining, on the basis of upper and lower threshold values set for the differential coefficient, a maximum value of the differential coefficient in a region exceeding the upper threshold value and a minimum value of the differential coefficient in a region smaller than the lower threshold value, and binarizing the detection signal by using the maximum or minimum value as a leading or trailing edge of a binary function.

In the present invention, an invisible symbol formed on a sample and containing a material which emits infrared light when heated is heated, and infrared light emitted from the invisible symbol as a result of heating is detected.

If the heating means exists near the sample while a signal is detected, heat from this heating means is detected as a noise, and this decreases the sensitivity. Also, when a signal is detected while the sample is heated, heat absorbed as infrared light by the barcode diffuses to the underlying substrate. This decreases the signal contrast between the barcode and the substrate. In the present invention, therefore, it is also possible to heat a sample on which an invisible barcode is formed and detect infrared light emitted from the barcode in the course of cooling the sample.

More specifically, heating means is installed apart from detecting means, and a sample is moved from the heating position of the heating means to the detection position of the detecting means. Alternatively, the heating means heating a sample is turned off before detection by the detecting means. When a method like this is used to detect infrared light emitted from a barcode during the course of sample cooling, thermal noise from the heating means can be reduced, and any decrease of contrast between the barcode and the substrate can be prevented.

Next, the detection signal obtained by the detecting means is binarized. This detection signal of a barcode is a curve corresponding to bars (black portions in common barcodes) and spaces. If there is no influence of thermal noise, it is possible to set an appropriate threshold value, regard portions larger and smaller than this threshold value to be bars and spaces, respectively, and determine points intersecting the threshold value as the start and end positions of each bar. However, even when thermal noise from the heating means is reduced as described above, ambient thermal noise is superposed on the detection signal of infrared light, so the whole detection signal often fluctuates. Hence, this simple method cannot binarize the signal.

In the present invention, the detection signal is differentiated, and maximum and minimum values of the differential coefficient are used to determine the start and end positions of a bar. More specifically, two threshold values, i.e., upper and lower threshold values are set with a predetermined width between them with respect to the differential coefficient of the detection signal. A maximum value of the differential coefficient in a region exceeding the upper threshold value and a minimum value of the differential coefficient in a region smaller than the lower threshold value are determined. The detection signal is binarized by using these peak values as the leading or trailing edge of a binary function. Note that the detection signal is desirably smoothed to reduce the influence of thermal noise before being differentiated. It is further desirable to smooth the slope in calculating the differential coefficient.

In actually used barcodes, the widths of bars (or spaces) are integral multiples of a basic width. However, the binary function obtained by the above method often shifts from an integral multiple of the basic width owing to the influence of noise or smoothing. Therefore, it is desirable to perform data processing of correcting the obtained binary function into an integral multiple of the basic width. When the data thus obtained is decoded in the same manner as for a common barcode, information recorded in the invisible barcode can be read.

The reading accuracy can be increased by using various rules applied to barcodes. For example, assuming a bar with the basic width is "1" and a space with the basic width is "0", a JAN code of eight characters is represented in accordance with the following rule. That is, a JAN code of eight characters is composed of left guard bars "101", four data characters on the left side, center bars "01010", three data characters on the right side, one modular check character, and right guard bars "101". One character (number) is expressed by forming a module seven times as large as the basic width by using two bars and two spaces. The boundary between characters coincides with a change from a bar to a space. The modular check character is used to check for a read error and takes a value calculated on the basis of the data characters.

An apparatus of the present invention can increase the reading accuracy by checking whether the result of binarization meets the aforementioned rules. The apparatus can also correct the result of binarization to eliminate contradiction. Details of the data processing method will be described later in examples of the present invention.

U.S. Pat. No. 5,294,198 discloses a semiconductor device evaluation apparatus for obtaining surface information of a sample by detecting infrared light emitted by heating. This apparatus observes infrared light emitted from different portions on the surface of a device and evaluates whether the device is normal or abnormal on the basis of the infrared emission (temperature). In this evaluation, the apparatus checks whether the deviation of each measured value from a reference value exceeds a predetermined value. However, an invisible symbol such as an invisible barcode as an object of the present invention cannot be read by simply-comparing the measured value with the reference value as in this apparatus.

Jpn. Pat. Appln. KOKAI Publication No. 7-282184 describes an apparatus for sensing infrared light emitted by heating to discriminate an invisible symbol for examining the genuineness of an article. In this apparatus, a heat roller heats an invisible symbol formed on the surface of a card by using a heat-absorbing substance, and an array sensor senses the thermal emission of light. The apparatus examines the genuineness of the card on the basis of matching between the magnetic information and the light-emitting invisible symbol. Unfortunately, an object of detection by this prior art is a genuineness examination mark larger than general barcodes. To read symbols such as barcodes as in the present invention, an optical system for detecting emission of infrared light with spatial resolution meeting the minimum width of a barcode is important. However, Jpn. Pat. Appln. KOKAI Publication No. 7-282184 does not describe any optical system for guiding light emission to an infrared sensor such as an array sensor. Hence, the apparatus cannot be applied to reading of barcodes.

Materials used in the present invention and components of a reading apparatus will be described in more detail below.

In the present invention, a compound having an infrared absorption wavelength far apart from that of a sample (substrate) is used as the material of an invisible barcode. Since infrared light is absorbed by atmospheric moisture or carbon dioxide depending on the wavelength, the intensity of a detection signal can largely vary in some cases. The detection signal is also readily influenced by water or contamination on the surface of an invisible barcode. Accordingly, it is important to eliminate these influences. It is, therefore, desirable to use a compound having a cyano (CN) group as the material of an invisible barcode, and the use of a polymer containing a cyano group is more desirable. This material is used in the form of ink-jet printer ink, thermal transfer ink ribbon, electrophotographic toner, or fiber to form an invisible barcode on a sample made of paper, polymer, cloth, or the like. For example, when an invisible barcode made from a polymer containing a cyano group is heated, the barcode emits infrared light with a wavelength of about 4.5 $\mu$m.

To obtain emission of infrared light from an invisible barcode by exciting molecular vibration of the barcode, a barcode containing a material which absorbs infrared light is heated. The heating means is desirably a contact type heater such as a thermal head, thermal bar, or hot stamp; a warm air heater; or a halogen lamp which emits infrared light in a broad wavelength range. To excite the molecular state of a barcode, it is also possible to irradiate light having a specific wavelength. However, this method is undesirable in terms of efficiency because light except for the specific wavelength is cut.

In the present invention, the heating means is preferably capable of heating the entire area of a barcode information portion at once. When a halogen lamp is used as this heating means, for example, a tubular halogen lamp is selected, and a bifocal reflector having an elliptic section is installed around the lamp. The lamp is positioned at one focal point of the reflector, and a sample is positioned at the other focal point. The reflector linearly condenses infrared light from the halogen lamp onto the sample and heats the sample with this light without contacting the sample. When the output of the halogen lamp is about 1 kW, however, a sample may be overheated to 100° C. or more in a few seconds if the sample is positioned at the focal point of the reflector. To prevent this, it is preferable to install means capable of adjusting the vertical position of the halogen lamp and place a sample in a position shifted a few mm from the focal point of the reflector. It is also preferable to heat a sample to a fixed temperature by determining the heating time and current value by measuring the temperature of the sample by a radiation thermometer and install a safety device for protecting the sample from overheating.

For a sample unsuited to being heated to a high temperature, e.g., a card in which magnetic information is written, it is necessary to heat only the barcode portion and hold the card main body at a low temperature. To this end, a heater is desirably brought into contact with the barcode printed surface to heat it.

When any of these heating means is used to heat a barcode, excessive heating of the surroundings causes thermal noise. Therefore, it is preferable to heat a barcode by adjusting not only the ultimate temperature but also the way the temperature is changed in accordance with each sample.

From the viewpoint of the read accuracy, the appropriate heating temperature of a sample has a certain relation to the sensitivity of a detector. That is, when the sensitivity of a detector is high, it is desirable to minimize the heating temperature of a sample to reduce unnecessary thermal noise. For example, when an MCT detector is used as will be described later, the heating temperature of a sample is preferably 50 to 100° C., and more preferably 70 to 80° C.

When a heated sample is moved from the heating position to the detection position so as to be put in the cooling process as described earlier, the moving direction can be either perpendicular or parallel to the scan direction of a barcode. Examples of the moving means are a stepping motor and conveyor rollers. It is also possible to use a hot stage having a built-in heating means such as a bar heater and turn off the heating means before a heated sample is subjected to detection by detecting means. This hot stage preferably has a mechanism capable of radiating heat and cooling. In order to make a sample brought into contact with the hot stage uniformly in plane, it is desirable to use a target described below.

Infrared light emitted from a barcode is invisible, so it is difficult to align the optical axis of a detecting optical system with a barcode information portion on a sample. To allow easy alignment, therefore, it is also possible to use a target for alignment and align a barcode region with this target. For example, a target obtained by forming a cross-shaped mark matching the optical axis of the optical system on a transparent film is used. Alternatively, a target having marks in three to four portions of a frame is used to align the intersection of extension lines of the marks with the optical axis of the optical system. Visible light can also be irradiated as guide light to attain alignment with the optical axis of the optical system. As a light source of this visible light, a low-output diode laser with a wavelength of about 650 nm can be used.

To detect infrared light emitted from a sample having a barcode on it in accordance with the position on the sample, the optical axis of the optical system and the sample are moved relative to each other. Two methods are possible for this purpose: one is a method of scanning the optical axis on the sample by rotating an optical element, and the other is a method of conveying the sample by a conveyor mechanism. The angle the optical axis of the optical system makes with a bar of a barcode sometimes changes in accordance with the position, and this may change the apparent bar width to be read. To prevent this, it is desirable to eliminate the dependence of the bar width on the position by positioning a sample at the focal point on the optical axis of the optical system and conveying the sample while a fixed angle is held between the optical axis and the sample. It is particularly desirable that the optical axis of the optical system and the sample surface be perpendicular to each other. Note that if the apparent bar width changes in accordance with the position, data correction is performed. To convey a sample by the conveyor mechanism, the way the sample is moved is adjusted in accordance with a barcode. Since the minimum bar width (basic width) of a common barcode is about 250 $\mu$m, the conveyance step is preferably 100 $\mu$m or less, and more preferably about 10 $\mu$m. When a detector composed of a satisfactorily large number of elements, e.g., an FPA (Focal Plane Array) is used, pieces of information concerning different portions of a sample can be obtained at once. This eliminates the need to convey the sample to read signals.

A mirror or a lens is used as an optical element for focusing and guiding infrared emission from a sample to the detector. When the object to be detected is a common barcode whose minimum width is about 250 $\mu$m, a proper optical element is chosen in accordance with the size of an element of the detector. When the size of each element constructing the detector is 100 $\mu$m or less, a barcode can be detected with satisfactorily high spatial resolution, so the optical element can be either a mirror or a lens. If the size of each element constructing the detector is larger than 100 $\mu$m, it is necessary to enlarge an image before image formation. Hence, the use of a lens or a combined mirror is desirable. If this is the case, a Cassegrain lens used in a microscopic optical system is desirable, and a lens with a large work length is more desirable. The material of the lens is so selected as to meet the wavelength of infrared light to be detected. If visible light is used as guide light, a material which transmits both visible light and infrared light is chosen as the lens material. An optical stop is desirably inserted on the optical axis of the optical system to improve the quality of light reaching the detector. If light beams having a different wave length from each other are incident to a refractive optical element, they pass different optical paths due to difference between focal lengths. Therefore, the use of the refractive optical element and the optical stop is advantageous because infrared light with a specific wavelength can be detected.

A method of selecting a wavelength can be used to reduce ambient thermal noise and detect infrared emission from a sample. To select a wavelength, a grating or a filter can be used. A grating can extract a wavelength in a narrow range, but the utilization (throughput) of light is low, and the apparatus is enlarged. A filter is obtained by performing appropriate optical processing for a substrate suited to a wavelength to be used and hence can be used easily. High-pass, low-pass, and bandpass filters can be selectively used. Infrared emission from a barcode shows peaks centering around a wavelength due to molecular vibration, whereas ambient thermal noise is independent of wavelength. By using a bandpass filter having a central wavelength corresponding to the wavelength of infrared emission from a barcode, it is possible to effectively remove thermal noise and selectively guide the infrared emission from the barcode to the detector. For example, when a barcode is formed by using polyacrylonitrile containing a cyano group, the wavelength of infrared emission is around 4.5 $\mu$m, so a bandpass filter which transmits this wavelength is used. Bandpass filters are classified into a wide-bandpass filter (10% or more of the central wavelength) and a narrow-bandpass filter (2% to 10% of the central wavelength) in accordance with the band width. The narrower the band width, the higher the efficiency of thermal noise removal, but the smaller the transmitted light intensity. Hence, it is desirable to use a bandpass filter having an appropriate band width in accordance with the sensitivity and S/N ratio of the detector.

As another method of reducing ambient thermal noise and detecting infrared emission from a sample, a method of optically modulating infrared emission and detecting the phase by using a lock-in amplifier is also effective. To optically modulate infrared emission, it is possible to use a method using an optical chopper, a tuning-fork chopper a polygon mirror or a galvano-mirror or a method which performs polarization modulation by additionally using a polarizing element. To avoid distortion of signals and reduction of the light intensity, the use of an optical chopper or a tuning-fork chopper is desirable. The modulation frequency is desirably 1 Hz to 100 kHz, and more desirably 10 Hz to 10 kHz.

To read a barcode, infrared emission can also be subjected to AC coupling amplification. When a sample having a barcode is conveyed at a rate at which the basic width of bars can be scanned in a time not exceeding the reciprocal of the cutoff frequency of an AC coupling amplifier (e.g., a time of 200 ms or less if the cutoff frequency is 5 Hz), infrared emission can be amplified without being influenced by ambient thermal noise. If the intensity of a signal whose phase is to be detected by a lock-in amplifier is low, a preamplifier is preferably installed before the lock-in amplifier to amplify the signal intensity by 10 to 100 times.

When a barcode is read by spatial resolution equivalent to the basic width of the barcode, the read time can be reduced by increasing the conveyance rate of a sample, but the apparatus function is superposed (convoluted) on the amplitude of a signal. If this is the case, it is desirable to use a filter as a function of the signal frequency on the signal to remove (deconvolute) the apparatus function and correct the amplitude and then binarize the signal.

As an infrared detector, a high-sensitivity detector having a sensitivity region meeting infrared emission from a barcode is used. When a barcode is formed by a polymer containing a cyano group, it is desirable to use a detector having an element made from MCT (Mercury Cadmium Tellurium), InSb (indium antimony), or PtSi (platinum silicide), each of which has high sensitivity near 4.5 $\mu$m. Any of these detectors is a quantum detector which detects infrared emission as light, so the detector is cooled to a low temperature to reduce thermal noise from the detecting element itself. The cooling means can be any of cooling using liquid nitrogen, electronic cooling using a Peltier element, Stirling cooling using a compressor, a pulse-tube cooling, and J-T (Joule-Thomson) cooling using adiabatic expansion. To perform cryogenic cooling, the use of liquid nitrogen, Stirling cooling or a pulse-tube cooling is desirable. Note that a detector such as a bolometer which detects infrared emission as heat requires no cooling and hence can be suitably used provided that the system generates intense signals or the detector has high sensitivity.

To distinguish between a signal from a barcode and thermal noise, it is preferable to regard the signal level of the underlying substrate as the signal level of background and correct a measured detection signal on the basis of this signal level. It is also possible to correct a measured detection signal by regarding the average signal level in a broad range including both an information portion and a peripheral portion (substrate) as the signal level of background. In this method, however, the background signal level is estimated to be higher than the actual level, so the contrast between the information portion and the peripheral portion lowers when correction is performed. Therefore, it is desirable to obtain the signal level of only the peripheral portion. To this end, a signal from the peripheral portion can be detected in a different step from the step of detecting a signal from the barcode information portion.

Also, the signal level of the peripheral portion is preferably electrically corrected by AC coupling amplification as follows. That is, the detection position is so moved as to alternately reciprocate over an information portion and a peripheral portion of a barcode across the edge of the barcode in a time not exceeding the reciprocal of the cutoff frequency of an AC coupling amplifier. The moving range is about 1 to ten-odd times the spot diameter from the edge of the barcode information portion. A signal change caused by this reciprocal motion can be separated, in accordance with the frequency, from a signal change resulting from conveyance of the barcode in the scan direction. Consequently, the detection position is preferably reciprocated at a rate 10 times the conveyance rate or more. This method can remove even slight thermal noise by correction using the signal level of the peripheral portion.

EXAMPLES

Examples of the present invention will be described below.

Example 1

An acrylonitrile (25%)-styrene (75%) copolymer (AS resin) was used as the material of an invisible barcode. This resin was pulverized to have an average size of 11 $\mu$m to prepare toner not containing pigments. This toner was used as toner of a laser beam printer to form an invisible linear barcode on plain paper. The formed barcode corresponds to an enlarged size with a basic width of 3 mm obtained by enlarging a JAN code with a basic width of 300 µm printed on an existing article selected at random.

FIG. 1 is a block diagram showing an invisible symbol reading apparatus used in this example. A sample 1 on which the invisible barcode is printed is held on a pulse stage 11. This pulse stage 11 moves in accordance with a signal from a stage controller 12. The sample 1 is heated by warm air blown from a warm air heater 13. This heating excites molecular vibration of a cyano group in the invisible barcode, and infrared emission occurs near 4.5 µm accordingly.

This infrared emission is reflected by an elliptic mirror 15 through an optical chopper 14 and detected by an MCT detector 17 through a bandpass infrared filter 16. The elliptic mirror 15 has a focal length of 100 mm and forms an image without changing the magnification. The MCT detector 17 has a highest-sensitivity wavelength of 4.5 µm, and its light-receiving surface is composed of square elements of 1 mm side. This MCT detector 17 is electronically cooled by a Peltier element and used at −60° C. A bias power supply 18 supplies power to the MCT detector 17. The MCT detector 17 converts a change in its electrical resistance caused by infrared light into a voltage and thereby generates a detection signal.

A preamplifier 19 amplifies the output from the MCT detector 17 by 100 times, and a lock-in amplifier 20 detects and amplifies the in-phase signal. A digital sampling oscilloscope (not shown) triggered by an output from the optical chopper displays the waveform of the detection signal. The detection signal is input to an A/D conversion board of a personal computer 21 and subjected to data processing (to be described later). A decoder 23 decodes the processed signal.

The operation was actually performed as follows. The sample 1 was held on the pulse stage 11 by a plate-like magnet and so adjusted that the invisible symbol region on the sample was positioned at the focal point of the optical system. The warm air heater 13 was so installed as to blow warm air against the sample 1. The position of blow of warm air was set upstream of the focal point (the position moved closer to the focal point when the stage moved), and a signal was detected. As a consequence, the signal intensity increased when the signal was measured by heating a position about 3 mm from the detection position by blowing warm air. Infrared emission at the focal point was detected while the pulse stage 11 was moved at a fixed rate by the signal from the stage controller 12. The movement of the pulse stage 11 was monitored by an optical sensor and measured by taking margins before and after the invisible barcode. Data of the detection signal was input as a file to the personal computer 21.

FIG. 2 shows a detection signal when the sample was heated to 70° C. In this detection signal, peaks and valleys are formed in accordance with bars and spaces, and the widths of the peaks (valleys) change in accordance with the widths of the bars (spaces). However, ambient thermal noise is superposed on the detection signal, so the signal waves as a whole. This makes it impossible to apply the method which sets an appropriate threshold value, regards portions larger and smaller than this threshold value as bars and spaces, respectively, and determine intersections to the threshold value as the start and end positions of each bar.

Hence, the measured data was processed as follows. First, the data was smoothed by using the moving average method to remove high-frequency noise. This high-frequency noise was removed when the rating of smoothing was 41 or more, for example, as a basic width corresponds with about 100. Next, the detection signal was differentiated for binarization. To remove the influence of thermal noise, the slopes at surrounding points were smoothed to calculate a differential coefficient y'.

Figure 3:
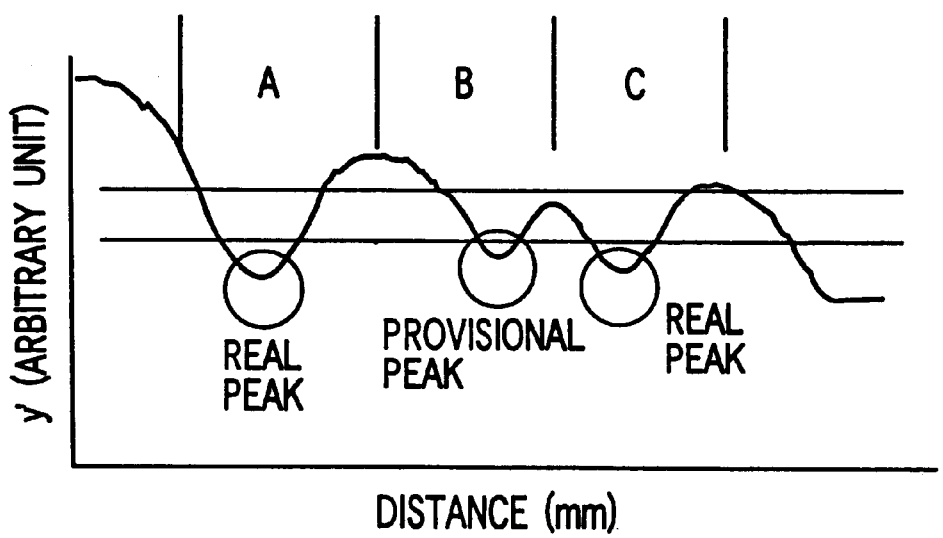
FIG. 3 is a graph for explaining a method of determining peak values from differential data of measured data in Example 1.

FIG. 3 is an enlarged view showing a partial change in the differential coefficient y' (ordinate) corresponding to the position (distance on the abscissa) on the sample. As shown in FIG. 3, two adequate threshold values were set for y'. An extreme value (maximum value) of y' in a region exceeding the upper threshold value and an extreme value (minimum value) of y' in a region smaller than the lower threshold value are candidates of the start and end positions of a bar (space). Peaks between the two threshold values were removed by regarding them as noise. Note that changing the threshold values by a magnitude of 5% or less of the amplitude (difference between the maximum and minimum values) had no influence on the results.

Figure 4:
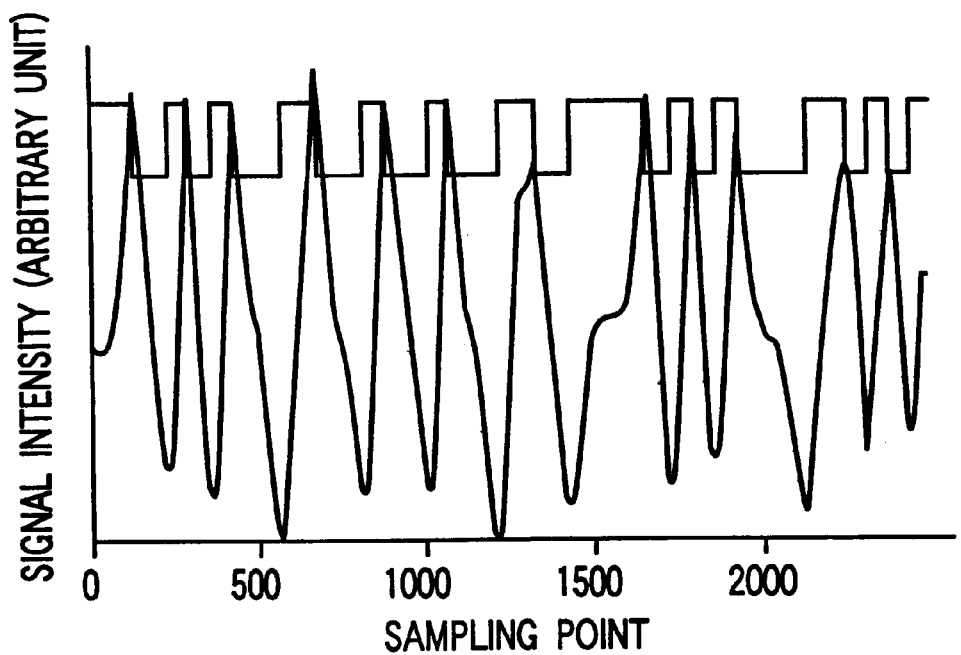
FIG. 4 is a graph showing differential data and a binary function in Example 1.

Bars and spaces alternately appear in an actual barcode, so the peaks of y' are also supposed to alternately appear above and below the threshold values. However, two peaks (peaks in ranges B and C in FIG. 3) can appear in a region smaller than the lower threshold value owing to the influence of thermal noise. If this is the case, real peaks are determined following a procedure below. First, a minimum value of y' appearing for the first time in a region smaller than the lower threshold value is regarded as a provisional minimum peak. As in a range A, if y' does not decrease after the provisional minimum peak and a maximum peak appears in a region exceeding the upper threshold value, the provisional minimum peak is considered to be a real minimum peak. On the other hand, as in the ranges B and C, if y' again decreases after the provisional minimum peak and before exceeding the upper threshold value and a minimum peak appears in the region smaller than the lower threshold value, these two minimum values in the ranges B and C are compared, and a smaller one is considered to be a real minimum peak. A real maximum peak is determined following the same procedure. Addresses x(i) of the leading and trailing edges of a binary function corresponding to a peak value y' (i) thus determined are the start and end positions of an actually measured bar. FIG. 4 collectively shows data of the differential coefficient y' and a binary function which rises and falls in the start and end positions, respectively, of a bar.

The width of a bar or a space is supposed to be obtained when the difference between two continuous addresses x(i+1) and x(i) is calculated. However, in this calculation the width of a bar or a space tended to be smaller than an integral multiple of the basic width under the influence of smoothing. In contrast, the total width of an adjacent bar and space was an integral multiple of the sum of the basic widths of the two. A detailed calculation procedure is as follows.

The difference between start addresses (or end addresses) x(i+2) and x(i) of adjacent bars is calculated as a width X(i). This X(i) corresponds to the total width of an adjacent bar and space. A plurality of X(i)'s are sorted and arranged in ascending order. A half value of the average of two smallest X's is calculated as an initial value of a basic width W. A value 2.5 times this W is used as a threshold value, and X's assumed to have a width $W_2$ which is twice the basic width are selected from X's equal to or smaller than the threshold value. The average value of these X's is calculated as new W. This new W and the initial value are compared, and the process is; repeated until the two values are equal. W finally obtained by this operation is regarded as a second initial value of W. A value 3.5 times this second W is used as a threshold value, and X's assumed to have a width $W_3$ which is three times the basic width are selected from X's equal to or smaller than the threshold value. The average value of these X's is calculated as new W. This new W and the second initial value are compared, and the process is repeated until the two values are equal. W finally obtained by this operation is regarded as a third initial value of W. In the same manner as above, a threshold value is calculated by using W finally obtained in the immediately preceding calculation as a new initial value. Similar calculations are repeatedly performed for $W_4$ and $W_5$ to obtain W as a fifth initial value. The value of each X(i) is divided by the fifth initial value W and rounded to obtain an integer. W is again calculated on the basis of X's from X assumed to have the width $W_2$ to X assumed to have the width $W_5$. This new W and the fifth initial value are compared, and the process is repeated until the two values are equal. In this manner a final basic width W is obtained.

The positions of bars and spaces are determined in units of the obtained basic width W. To align the start position of the barcode while correcting any offset caused by noise, let the entire offset be d and the corrected value of W be ω. While ω is changed in units of 0.001 W from 0.99 W to 1.01 W and d is changed in units of 0.01ω from −0.5ω to 0.5ω for certain ω, summation Σδ of differences δ between a (bar start or end address) and an (integral multiple of ω) is calculated as per $$\sum \delta = \sum_{i=0}^{n} \left| x(i) - \text{INT}\left(\frac{x(i)-d}{\omega} + 0.5\right) \times \omega + d \right|$$

$$y(i) = \text{INT}\left(\frac{x(i)-d}{\omega} + 0.5\right)$$

Σδ for different combinations of ω and d are compared, and a combination of ω and d by which Σδ is a minimum is determined.

Figure 5:
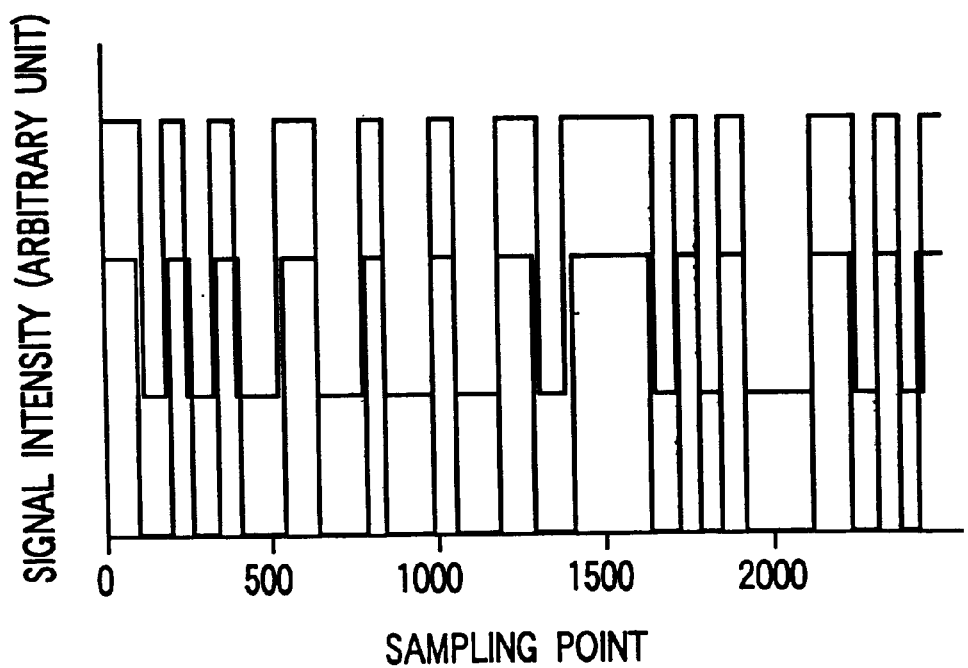
FIG. 5 is a graph showing a binary function and data obtained by optimizing the widths of bars and spaces.

The bar start or end address x(i) is corrected by the offset d and represented by an integral multiple y(i) of ω (an integer is obtained by rounding). A bar or space width Y(i) is calculated from the difference between the integral addresses y(i). FIG. 5 shows data obtained by optimizing the final bar or space width thus obtained and a binary function. This optimized data was decoded by the decoder 23. Consequently, the decoded data matched the result of decoding of enlarged data of the original data printed on the existing article.

Example 2

Toner made from the same AS resin as used in Example 1 was used as toner of a laser beam printer to form an invisible barcode on plain paper. The formed barcode corresponds to a standard-size barcode with a basic width of 300 μm printed on an existing article selected at random.

Figure 7A:
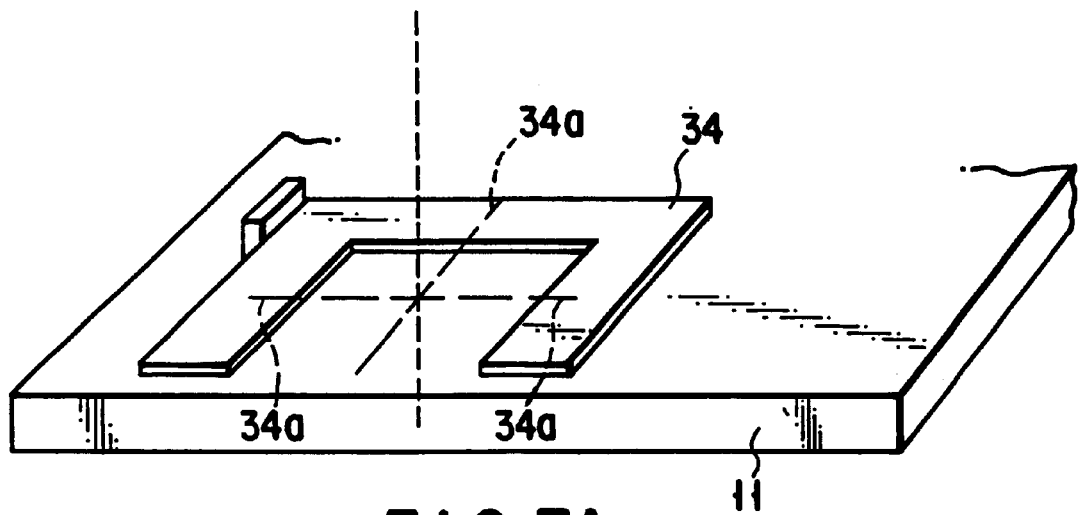
FIG. 7A is a perspective view of a stage and a target used in the invisible symbol reading apparatus of Example 2.
Figure 7B:
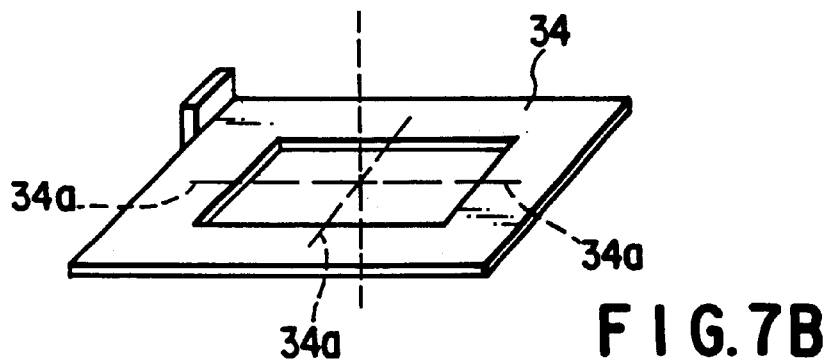
FIG. 7B is a perspective view of the target.
Figure 7C:
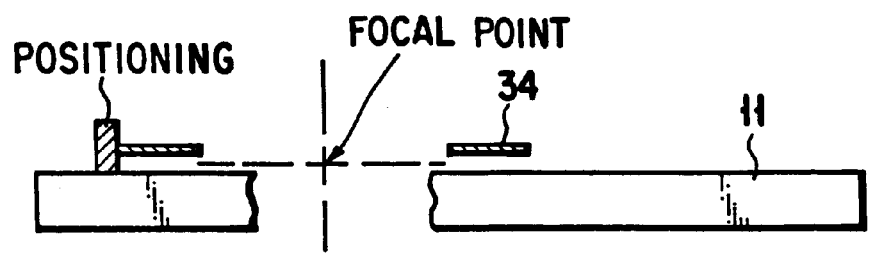
FIG. 7C is a sectional view of the stage and the target.

FIG. 6 is a block diagram showing an invisible symbol reading apparatus used in this example. A holder 32 having a built-in bar heater 31 holds a sample 1 on which the invisible barcode is printed on a pulse stage 11. A signal from a built-in thermocouple (not shown) of the holder 32 is input to a temperature controller 33 to adjust the current to be supplied to the bar heater 31, thereby heating the sample 1 to a predetermined temperature. A target 34 is used to align the optical axis of an optical system and a barcode formation region of the sample 1. As shown in FIG. 7A or 7B, this target 34 is a frame-like member, and three or four marks 34a are formed on it. As shown in FIGS. 7A to 7C, the intersection of extension lines of the marks 34a is aligned with the optical axis of the optical system. The target 34 functions as a keep plate to hold down the sample 1 on the holder 32.

An MCT detector 17 detects infrared emission from the invisible barcode through an optical chopper 14, a Cassegrain lens 35, and a bandpass infrared filter 16. An optical stop (not shown) is installed on the optical axis. The Cassegrain lens 35 has a focal length of 13 mm and forms an enlarged image of ×15. The MCT detector 17 has a highest-sensitivity wavelength of 4.5 μm, and its light-receiving surface is composed of square elements of 1 mm side. This MCT detector 17 is electronically cooled by liquid nitrogen and used at −200° C. A bias power supply 18 supplies power to the MCT detector 17.

As in Example 1, a preamplifier 19 amplifies the output from the MCT detector 17 by 100 times, and a lock-in amplifier 20 detects and amplifies the phase of the signal. A digital sampling oscilloscope (not shown) triggered by an output from the optical chopper displays the waveform of the detection signal. The detection signal is input to an A/D conversion board 22 of a personal computer 21 and subjected to data processing (to be described later). A decoder 23 decodes the processed signal.

The operation was actually performed as follows. The sample 1 was held on the pulse stage 11 by a plate-like magnet and so adjusted that the invisible barcode region on the sample was positioned at the focal point of the optical system. The sample 1 was heated to 70° C. under the control of the temperature controller 33. Infrared emission at the focal point was detected while the pulse stage 11 was moved at a fixed rate by the signal from the stage controller 12. The start and end positions of the barcode were measured by taking margins for these positions by using limit switch signals from the pulse stage 11. Data of the detection signal was input as a file to the personal computer 21.

Following the same procedures as in Example 1, the measured data was smoothed and binarized by differentiation, and the bar and space widths were optimized. This optimized data was decoded by the decoder 23. Consequently, the decoded data matched the result of decoding of the original data printed on the existing article.

Example 3

A polyacrylonitrile powder was dispersed in a 5 wt % aqueous polyvinyl alcohol solution at a ratio of 2 wt % with respect to polyvinyl alcohol. The resultant dispersion was used as ink of an ink jet printer to form an invisible barcode on plain paper. The formed barcode corresponds to the same standard-size barcode with a basic width of 300 μm as in Example 2.

A reading apparatus shown in FIG. 6 was used to heat a sample 1 to 70° C. while a pulse stage 11 was moved at a fixed rate. Infrared emission at a focal point was detected and input to a personal computer 21. The start and end positions of the barcode were measured by taking margins for these positions by using limit switch signals from the pulse stage 11. Following the same procedures as in Example 1, the measured data was smoothed and binarized by differentiation, and the bar and space widths were optimized. This optimized data was decoded by a decoder 23, the decoded data matched the result of decoding of the original data.

Example 4

An acrylonitrile-styrene copolymer (AS resin) was dissolved in toluene, and the solution was mixed with wax. A substrate was coated with the resultant material and dried to form a heat-sensitive ink ribbon. This heat-sensitive ink ribbon was used to form an invisible barcode on plain paper. The formed barcode corresponds to the same standard-size barcode with a basic width of 300 µm as in Example 2.

A reading apparatus shown in FIG. 6 was used to heat a sample 1 to 70° C. while a pulse stage 11 was moved at a fixed rate. Infrared emission at a focal point was detected and input to a personal computer 21. The start and end positions of the barcode were measured by taking margins for these positions by using limit switch signals from the pulse stage 11. Following the same procedures as in Example 1, the measured data was smoothed and binarized by differentiation, and the bar and space widths were optimized. This optimized data was decoded by a decoder 23, and the decoded data matched the result of decoding of the original data.

Example 5

Figures 8A, 8B:
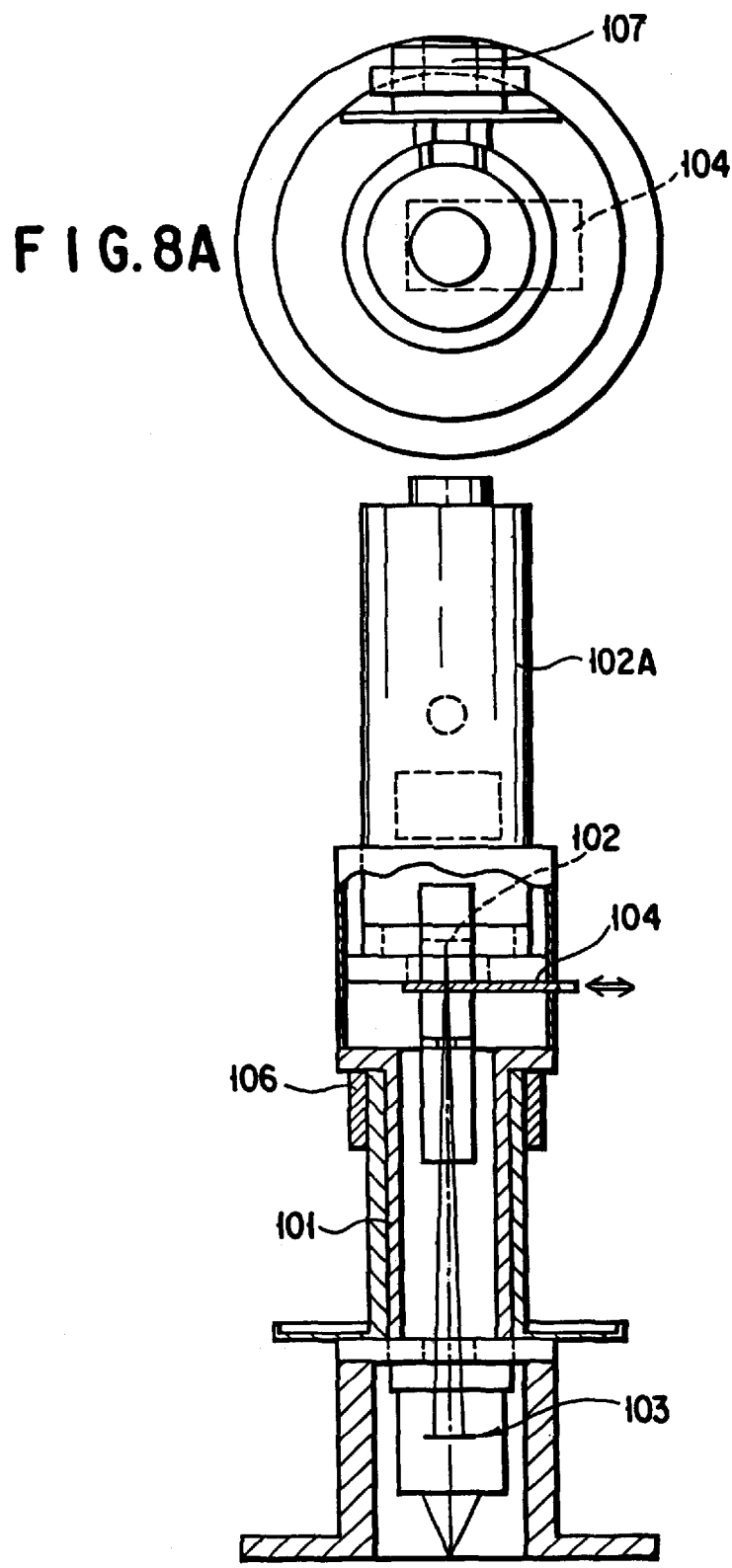
FIG. 8A is a plan view showing an invisible symbol reading apparatus of Example 5 and FIG. 8B is a front view of the apparatus.

FIGS. 8A and 8B show details of the main parts of the reading apparatus according to the present invention. FIG. 8A is a plan view, and FIG. 8B is a front view. A lens barrel 101, an MCT detector 102, and a liquid nitrogen tank 102A for cooling vertically extend above the sample surface. A reflecting objective lens 103 and a bandpass infrared filter 104 are arranged on the optical axis of an optical system. An image of infrared light from the sample is formed on the light receiving surface of the MCT detector 102. The focal point of the optical system is adjusted by a focal point adjusting screw 106. The MCT detector 102 inputs a detection signal to a preamplifier 107.

Example 6

An acrylonitrile (25%)-styrene (75%) copolymer (AS resin) was used as the material of an invisible. barcode. This resin was pulverized to have an average size of 11 µm to prepare toner not containing pigments. This toner was used as toner of a laser beam printer to form an invisible barcode on label paper. The formed barcode corresponds to a barcode with a basic width of 300 µm printed on an existing article selected at random. The label paper on which the invisible barcode was formed was pasted on a plastic card to form a sample (A).

Figure 9:
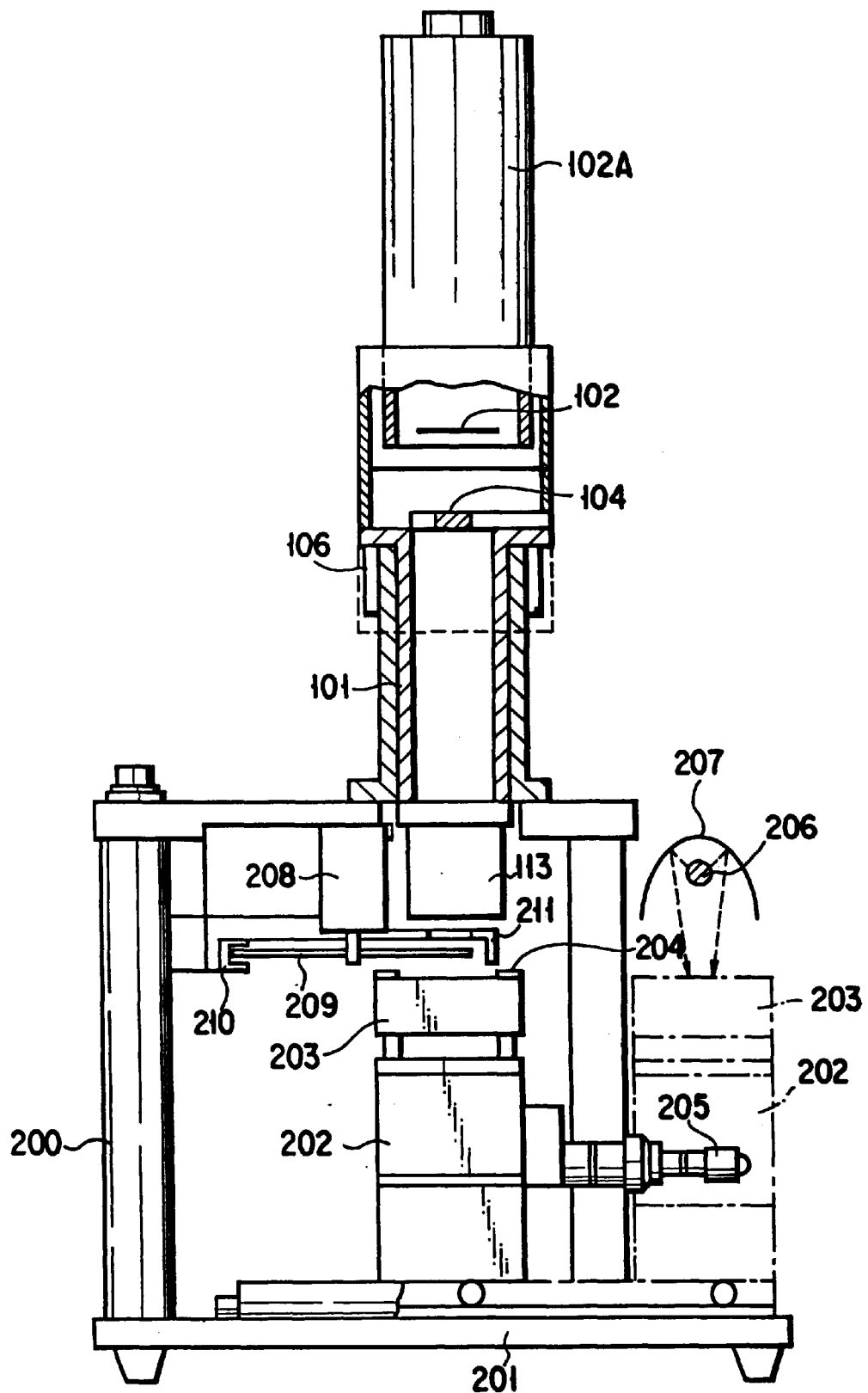
FIG. 9 is a view showing the construction of an invisible symbol reading apparatus of Example 6.
Figure 10:
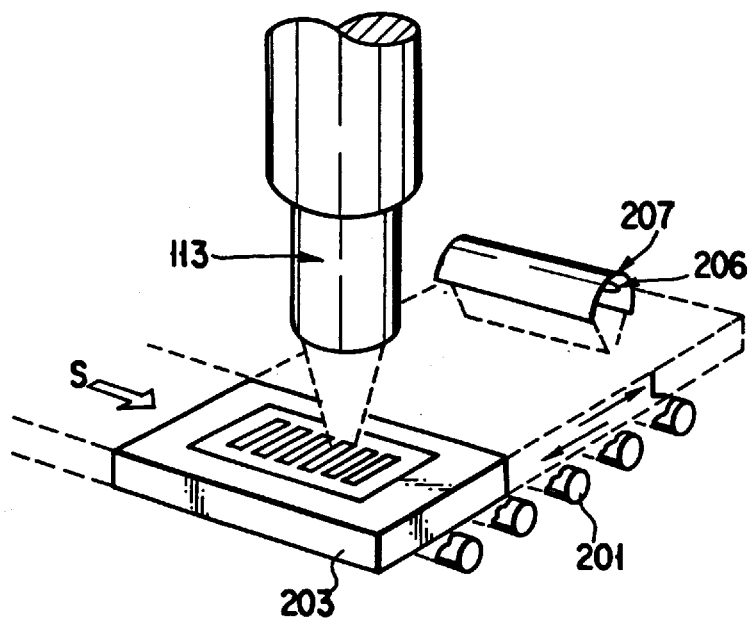
FIG. 10 is a perspective view showing the positional relationship between a tubular halogen lamp with reflector and a stage top plate in the invisible symbol reading apparatus.
Figure 11:
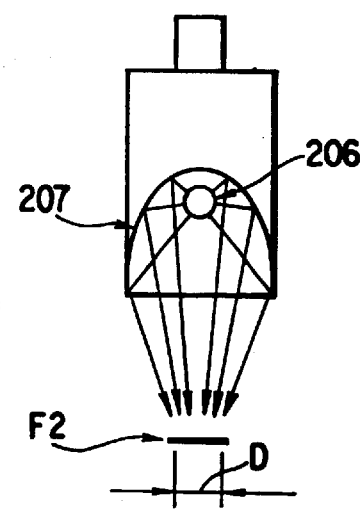
FIG. 11 is a sectional view of the tubular halogen lamp with reflector of the invisible symbol reading apparatus of Example 6.

FIG. 9 shows the construction of a barcode reading apparatus used in this example. FIG. 10 is a perspective view showing the positional relationship between a stage for holding a sample and a tubular halogen lamp with reflector in this barcode reading apparatus. FIG. 11 is a sectional view of the tubular halogen lamp with reflector. The barcode reading apparatus of this example will be described in more detail below with reference to FIGS. 9 to 11.

Rollers 201 are placed below a frame 200, and a pulse stage 202 and a stage top plate 203 are mounted on these rollers 201. A sample 1 on which the invisible barcode label paper is pasted is placed on the stage top plate 203 and aligned with reference to a target 204. These components are moved between a detection position (indicated by the solid lines) and a heating position (indicated by the alternate long and short dashed lines) along a direction L shown in FIG. 10 by an air valve (not shown). The pulse stage 202 moves in a direction S (barcode scan direction) shown in FIG. 10 under the control of a stage controller (not shown). A micrometer 205 adjusts the height of the stage top plate 203.

A tubular halogen lamp 206 with a reflector 207 is so installed as to be positioned above the sample when the sample moves to the heating position. As shown in FIG. 11, the section of the reflector 207 forms a part of an ellipse. The halogen lamp 206 is arranged at the first focal point of the reflector 207 and installed in a lamp house. Light from the halogen lamp 206 is linearly condensed to have a width D at a second focal point F2. The lamp house includes a mechanism (not shown) for adjusting its vertical position. To protect the sample from overheating, this mechanism adjusts its vertical position so that the upper surface of the sample deviates 2 to 6 mm from the focal point of the reflector 207. A radiation thermometer (not shown) detects the temperature on the upper surface on the sample. If the temperature exceeds a set value, a safety device sends an alarm signal to the power supply of the halogen lamp 206 to cut off the switch.

An optical chopper unit is attached to the frame 200. In this unit, a motor 208 is mounted facing down, and an optical chopper 209 is held by this motor 208 so as to be rotatable above the sample in the detection position. An optical sensor 210 measures the rotating speed of the optical chopper 209. A frame 211 for safety is formed around the optical chopper 209. A window is formed in this frame 211 to allow infrared emission from the sample to reach a detecting optical system. The frame 200 also holds a lens barrel 101 of the detecting optical system including a calcium fluoride lens 113, a bandpass infrared filter 104, and an MCT detector 102 above the optical chopper 209. The calcium fluoride lens 113 has a diameter of 25 mm and a focal length of 50 mm. The focal point of the optical system is adjusted by a focal point adjusting screw 106. Although not shown, an optical stop is arranged on the optical axis of the detecting optical system.

A barcode is read by using the above reading apparatus as follows. First, the pulse stage 202 is set in the detection position, and a sample is placed on the stage top plate 203. The optical axis of the detecting optical system and a barcode information portion of the sample 1 are aligned with reference to the target 204. That is, the end of a left margin of the barcode is positioned on the optical axis of the detecting optical system. This position is an initial position of the sample 1. Next, the air valve is activated to move the sample 1 together with the stage top plate 203 to the heating position. The halogen lamp 206 heats the upper surface of the sample 1 to 75° C. in the initial position. This heating excites. molecular vibration of a cyano group contained in the invisible barcode material on the sample 1, and infrared emission near 4.5 µm occurs accordingly. After heating, the stage top plate 203 is immediately returned to the initial position, and the infrared emission is detected in a cooling process as follows.

A stage controller (not shown) supplies a signal to scan the pulse stage 202 at a fixed rate of. 20 mm/sec in the direction S. The infrared emission from the sample 1 is condensed by the calcium fluoride lens 113 through the optical chopper 209 and detected by the MCT detector 102 through the bandpass infrared filter 104. The calcium fluoride lens 113 has a diameter of 25 mm and a focal length of 50 mm. The distance between the lens and the detector is 2.5 times (magnification is ×2.5) the distance between the lens and the sample. The MCT detector 102 has a highest-sensitivity wavelength of 4.5 µm, and its light receiving surface is composed of square elements of 1 mm side. When in use, this MCT detector 102 is cooled to −200° C. by liquid nitrogen 102A. A bias power supply (not shown) supplies power to the MCT detector 102. The MCT detector 102 converts a change in its electrical resistance caused by the infrared emission into a voltage and thereby generates a detection signal.

A preamplifier amplifies the output from the MCT detector 102 by 100 times, and a lock-in amplifier. detects and amplifies the in-phase signal. A digital sampling oscilloscbpe, (not shown) triggered by an output from the optical chopper 209 displays the waveform of the detection signal. The detection signal is input to an A/D conversion board of a computer and subjected to data processing as follows. A decoder decodes the processed signal.

Figure 12:
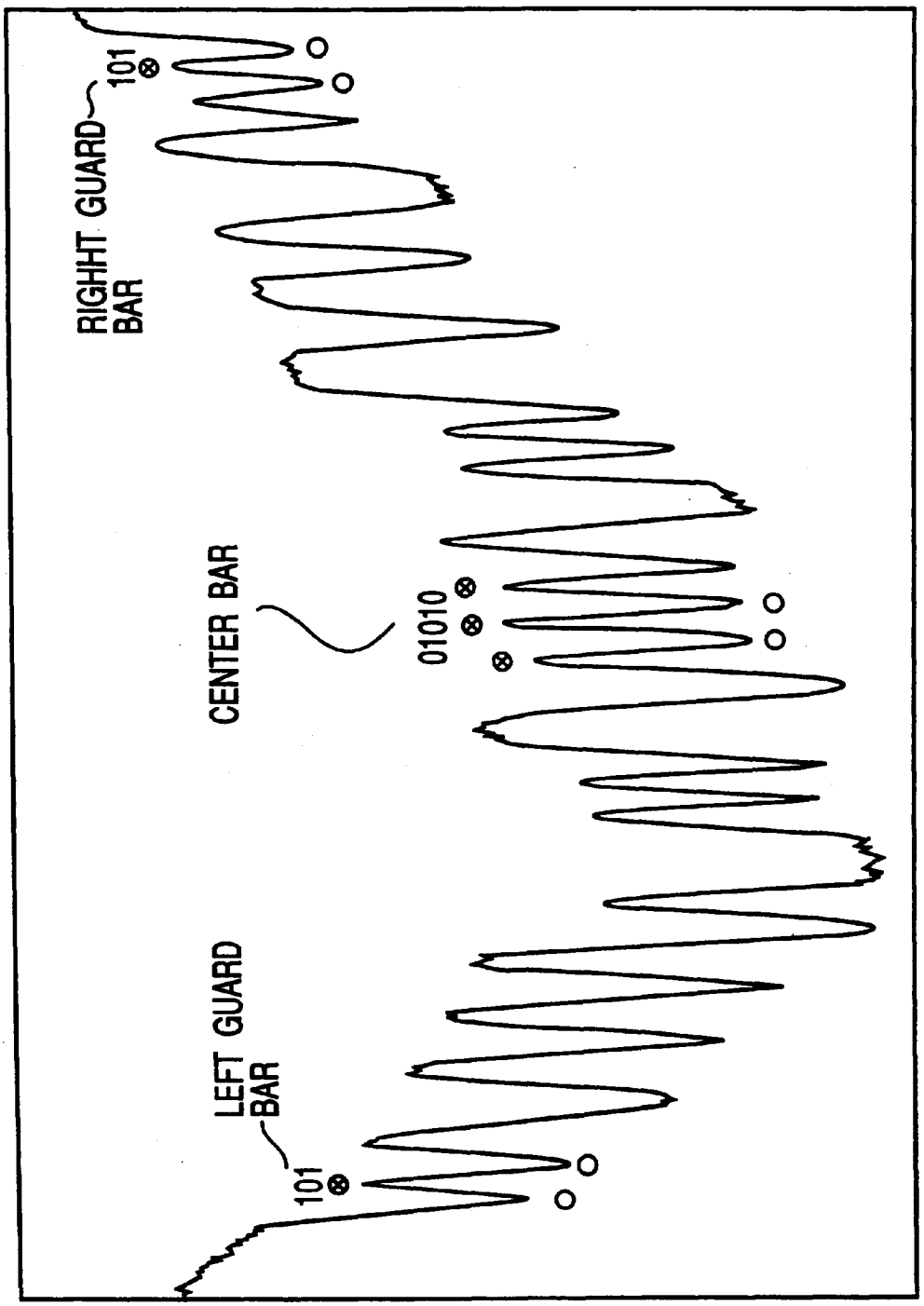
FIG. 12 is a graph showing infrared light intensity emitted from a measured barcode in Example 6.

FIG. 12 shows data of a differential coefficient obtained by smoothing the detection signal of the infrared emission from the sample and differentiating the smoothed signal as in Example 1. In this example, barcodes were read by using the JAN code rules. As described earlier, a JAN code of eight characters is composed of left guard bars "101", four data characters on the left side, center bars "01010", three data characters on the right side, one modular check character, and right guard bars "101". One character (number) is expressed by forming a module seven times as large as the basic width by using two bars and two spaces.

In the differential coefficient data shown in FIG. 12, the left guard bars "101" are first detected. The center bars "01010" are then detected by looking up the left guard bar detection signal. The left guard bars are removed from the measured signal. Next, the differential coefficient shown in FIG. 12 is divided into each characters within left to center bars by two bars and two spaces. Meanwhile, reference signals of modules corresponding to individual numbers are obtained. The correlation between each reference signal and an actually measured signal is calculated to obtain a number by which the correlated value of the two signals is a maximum. By this manipulation, numbers corresponding to the modules divided as above are determined.

In this example, when the upper surface of the sample was heated to 75° C., the barcode read accuracy was 90% or more. However, the read accuracy was about 50% and about 90% when the upper surface of the sample was 50° C. and 90° C., respectively.

Instead of the sample (A), samples (B) and (C) were prepared by forming barcodes as follows.

Sample (B); A.polyacrylonitrile powder was dispersed in a 5 wt % aqueous polyvinyl alcohol solution at a ratio of 2 wt % with respect to polyvinyl alcohol. The resultant material was used to form a barcode on plain paper.

Sample (C): An acrylonitrile-styrene copolymer (AS resin) was.dissolved in toluene, and the solution was mixed with wax. A film substrate was coated with the resultant material and dried to form a heat-sensitive ink ribbon. This heat-sensitive ink ribbon was used to form a barcode on plain paper.

Results similar to those described above were obtained when these samples (B) and (C) were used.

Example 7

Figure 13:
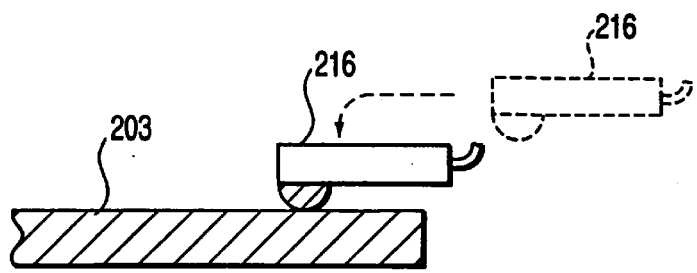
FIG. 13 is a view showing the operation of a thermal head in an invisible symbol reading apparatus of Example 7.

As shown in FIG. 13, a thermal head 216 was used as heating means instead of the tubular halogen lamp in Example 6. This thermal head 216 has a mechanism for adjusting its vertical position. When a sample moves to the heating position, the thermal head 216 is moved downward and pushed against the sample. The pulse width of a pulse voltage to be applied to the thermal head 216 is related to the temperature on the upper surface of the sample and the signal intensity of infrared emission. In this manner a pulse voltage with an appropriate pulse width is applied to the thermal head 216.

As in Example 6, a pulse stage 202 is set in the detection position. After a sample 1 is placed on a stage top plate 203, an air valve is activated to move the sample 1 together with the stage top plate 203 to the heating position. The thermal head 216 heats the upper surface of the sample 1 to 75° C. in the initial position. After that, the stage top plate 203 is immediately returned to the initial position, and infrared emission is detected in the process of cooling as in Example 6.

The same sample (A) as used in Example 6 was used to detect infrared emission from a barcode following the same procedure as in Example 6. Data optimized in the same manner as in Example 6 was decoded by a decoder. Consequently, the decoded data matched the result of decoding of the original data printed on the existing article.

Example 8

Figure 14:
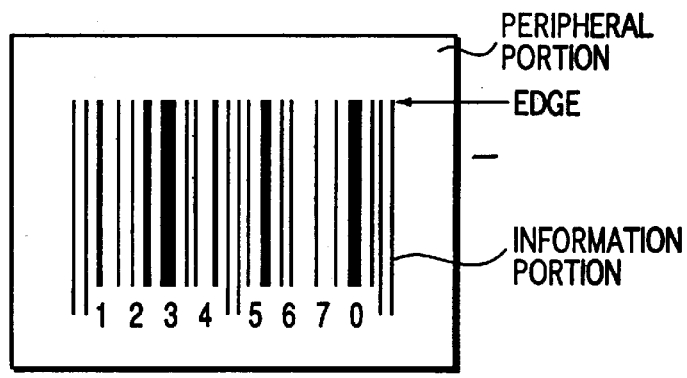
FIG. 14 is a plan view showing a barcode information portion and its peripheral portion.

When measurement is performed in the same manner as in Example 7, a signal of a peripheral portion is detected as follows in addition to a signal of a barcode information portion shown in FIG. 14. This signal of the peripheral portion is used as a background level to correct the detection signal of the barcode information portion.

A pulse stage 202 is set in the detection position, and a sample 1 is placed on a stage top plate 203. After the barcode information portion is aligned in this initial position, an air valve is activated to move the sample 1 together with the stage top plate 203 to the heating position. A thermal head 216 heats the upper surface of the sample 1 to 75° C. in the initial position. After that, the stage top plate 203 is immediately returned to the initial position. In the subsequent cooling process, while the pulse stage 202 is moved at a fixed rate of 20 mm/sec, infrared emission from the barcode information portion is detected and input as a file to a computer.

Next, the stage top plate 203 is returned to the initial position, and the optical axis of the detecting optical system is aligned with the peripheral portion of the barcode information portion. After that, infrared emission from the peripheral portion is detected and input as a file to the computer.

As data processing, smoothing, binarization by differentiation, and width adjustment were performed following the same procedures as in Example 1 for a difference obtained by subtracting the peripheral portion signal from the barcode information portion signal. Data optimized in the same manner as in Example 1 was decoded by a decoder, and the decoded data matched the result of decoding of the original data printed on the existing article.

Example 9

When measurement is performed in the same manner as in Example 7, a signal of a peripheral portion is detected as follows in addition to a signal of a barcode information portion shown in FIG. 14. This signal of the peripheral portion is used as a background level to correct the detection signal of the barcode information portion.

A pulse stage 202 is set in the detection position, and a sample 1 is placed on a stage top plate 203. After the barcode information portion is aligned in this initial position, an air valve is activated to move the sample 1 together with the stage top plate 203 to the heating position. A thermal head 216 heats the upper surface of the sample 1 to 75° C. in the initial position. After that, the stage top plate 203 is immediately returned to the initial position. In the subsequent cooling process, the pulse stage 202 is scanned in a direction S at a fixed rate of 20 mm/sec. Synchronizing with this scanning, rollers 201 are rotated to reciprocate the sample 1 in a direction L at a rate of 200 mm/sec such that the barcode information portion and the peripheral portion are alternately scanned across the edge (the boundary between the information portion and the peripheral portion) of the barcode information portion shown in FIG. 14. In this manner, infrared emission from the barcode information portion and that from the peripheral portion are detected. The obtained signals are amplified by an AC coupled-amplifier and input as a file to a computer.

Smoothing, binarization by differentiation, and width adjustment were performed for the obtained data. When the optimized data was decoded by a decoder, the decoded data matched the result of decoding of the original data printed on the existing article.

Example 10

Figure 15:
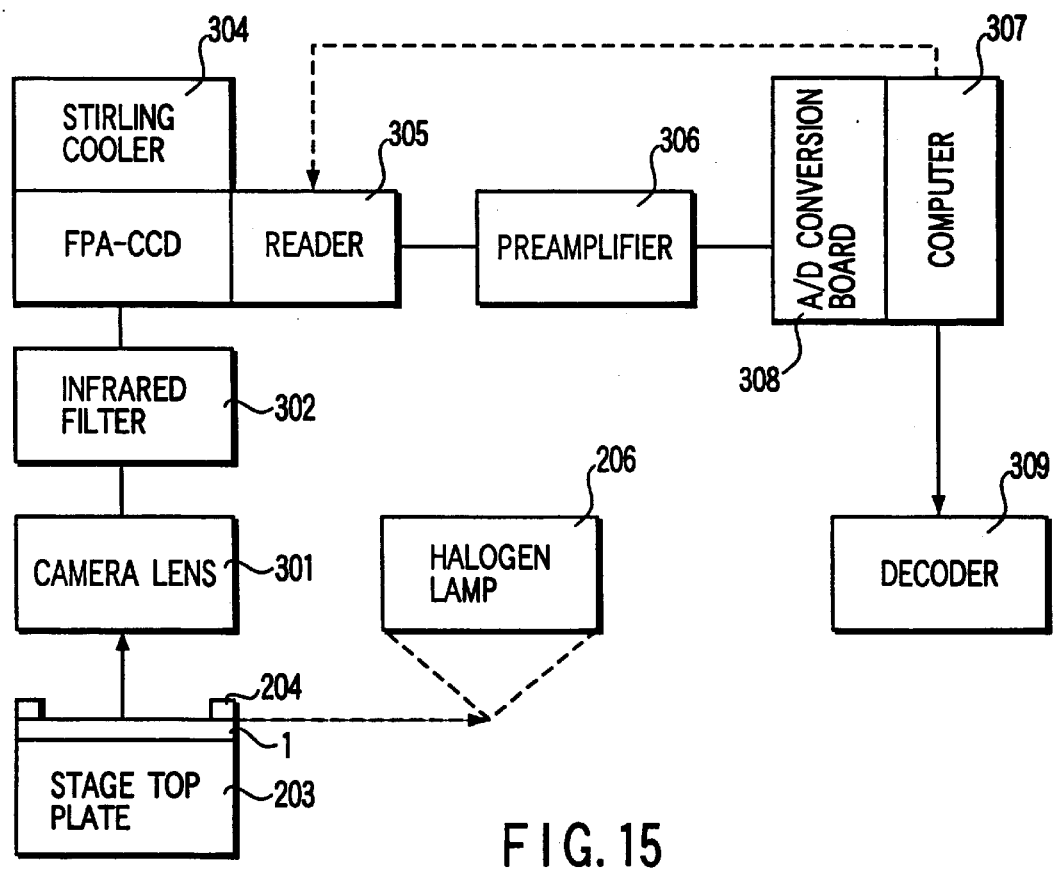
FIG. 15 is a block diagram showing an invisible symbol reading apparatus of Example 10.

FIG. 15 is a block diagram showing a barcode reading apparatus used in this example. This apparatus uses a silicon macro camera lens as an optical element for condensing and guiding infrared emission from a sample to a detector, and a PtSi FPA-CCD as an infrared detector.

As in the apparatus shown in FIG. 9, a pulse stage and a stage top plate 203 are mounted on rollers. A sample 1 is placed on the stage top plate 203 and. aligned by looking up a target 204. When the sample 1 moves to the heating position, a tubular halogen lamp 206 with reflector heats the sample 1. In the detection position, a silicon macro camera lens 301, a bandpass infrared filter 302, and a PtSi FPA-CCD 303 are positioned above the sample 1. The silicon macro camera lens 301 includes an antireflection coating and has a viewing angle of 20°×15° and a minimum focal length of 250 mm. The FPA-CCD 303 has a highest-sensitivity wavelength of 4.5 $\mu$m, includes 320×240 pixels, and is cooled to −200° C. by a Stirling cooler 304 when in use. Electric charge stored in the EPA-CCD 303 is transferred to a reader 305 synchronizing with a sync signal. The signal transferred to the reader 305 is amplified by a preamplifier 306, input to an A/D conversion board 308 of a computer 307, and decoded by a decoder 309.

The pulse stage is set in the detection position, and the sample 1 is placed on the stage top plate 203. The center of the FPA-CCD 303 and the center of a barcode information portion of the sample 1 are aligned with reference to the target 204. An air valve is activated to move the sample 1 together with the stage top plate 203 to the heating position. The halogen lamp 206 heats the upper surface of the sample 1 to 75° C. in the initial position. After heating, the stage top plate 203 is immediately returned to the initial position, and infrared emission is detected in the cooling process.

The infrared emission from the sample 1 was input as a two-dimensional image file to the computer 307. Smoothing and signal integration within a set.range were performed for this two-dimensional measured data to obtain one-dimensional data. this one-dimensional data was subjected to binarization by differentiation and width adjustment. The processed data was decoded by the decoder 309, and the decoded data matched the result of decoding of the original data printed on the existing article.

Example 11

Toner made from the same AS resin as used in Example 6 was used as toner of a laser beam printer to form an invisible barcode on plain paper. This barcode corresponds to a standard-size barcode with a basic width of 300 $\mu$m printed on an existing article selected at random.

Figure 16A:
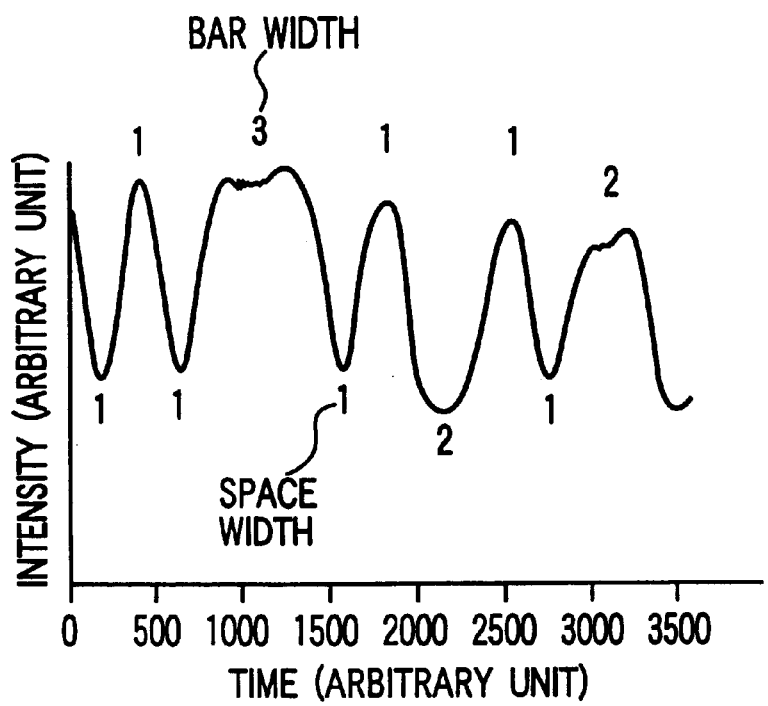
FIGS. 16A and 16B are graphs showing infrared emission signals obtained by different spatial resolutions.
Figure 16B:
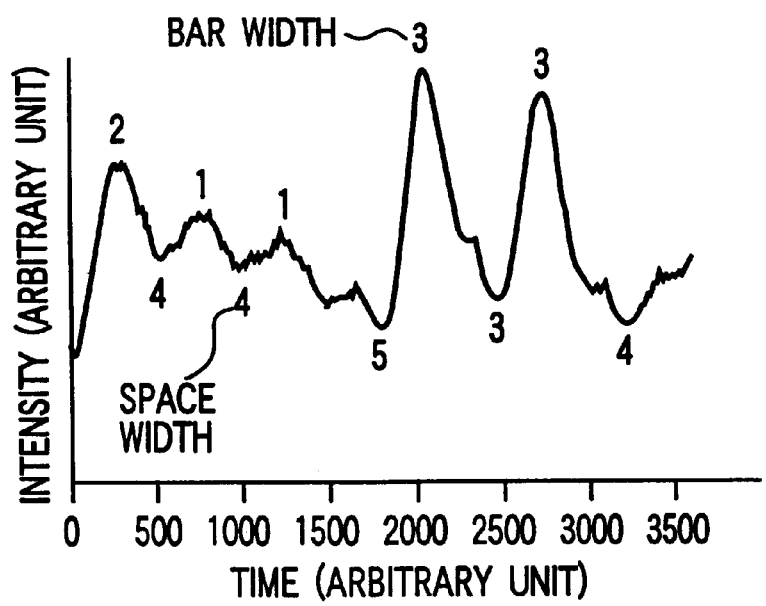

When the barcode is read with spatial resolution higher than the basic width of its module, a signal having a time width corresponding to the width of a bar or a space is obtained (FIG. 16A). When the barcode is read with spatial resolution equivalent to the basic width of its module, the read time can be shortened, but the apparatus function is superposed (convoluted) on the amplitude of a signal (FIG. 16B). Consequently, as can be seen by the comparison of the signal shown in FIG. 16B with the signal shown in FIG. 16A, peaks of the signal with low intensity become low, and this obscures the correspondence between the time width of the signal and the width of a bar or a space. Therefore, it is desirable to allow a filter that serves as a function of the frequency of a detection signal as shown in FIG. 16B to act on the signal to remove (deconvolute) the apparatus function and correct the amplitude and then binarize the signal.

In this example, an invisible symbol reading apparatus as shown in FIG. 6 was used, the temperature was controlled by turning on and off a temperature controller, and the barcode was read in the cooling process as follows. A sample 1 was held on a holder 32 by a plate-like magnet and so adjusted that a barcode information portion of the sample 1 was positioned at the focal point of a detecting optical system by looking up a target 34. To adjust the optical axis, guide light with a wavelength of 640 nm was irradiated from a semiconductor laser (not shown). However, the focal point of this guide light shifted from the focal point of infrared emission. Hence, after the in-plane position of the optical axis was adjusted by the guide light, final adjustment was performed by monitoring an output from an MCT detector 17 on an oscilloscope. The temperature to which the sample 1 was heated under the control of a temperature controller 33 was adjusted to 90° C. A signal from a built-in thermocouple (not shown) of the holder 32 was input to the temperature controller 33. On the-basis of this signal, the current to be supplied to a bar heater 31 was adjusted. Before the sample 1 was scanned, the temperature controller 33 was turned off to put the sample 1 in the cooling process. While a pulse stage 11 was moved at a fixed speed by a signal from a stage controller 12, infrared emission at the focal point was detected. The start and end positions of the barcode were measured by taking margins for these positions by using limit switch signals from the pulse stage 11. Data of the detection signal was input as a file to a computer 21.

If the signal intensity is high, an optical stop can be installed on the optical axis to reduce wavelength components except for the wavelength to be measured, thereby effectively performing wavelength selection. If this is the case, a bandpass infrared filter 16 is unnecessary.

Filtering was performed for actually measured data as shown in FIG. 16B to remove the apparatus function and smooth the data. After that, binarization by differentiation and width adjustment were performed in the same manner as in Example 1. When the data was decoded by a decoder, the decoded data matched the result of decoding of the original data printed on the existing article.

Example 12

A heat sensitive ink ribbon similar to that used in the formation of the sample (C) in Example 6 was used to form an invisible barcode on a plastic card. This barcode corresponds to a standard-size barcode with a basic width of 300 $\mu$m printed on an existing article selected at random.

Figure 17:
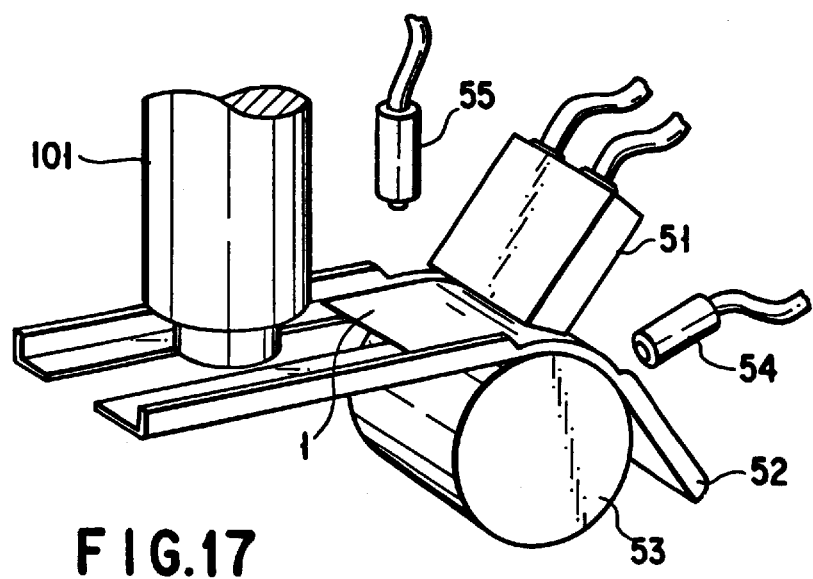
FIG. 17 is a perspective view showing an arrangement of a detecting optical system, heating means, and conveyor means of an invisible symbol reading apparatus of Example 12.

In this example, a barcode reading apparatus having heating means and a detecting optical system shown in FIG. 17 was used. This reading apparatus has a thermal bar 51 separated from a lens barrel 101 of the detecting optical system including a Cassegrain lens and the like. A guide 52 is formed below these members. A card type sample 1 is placed with its barcode printed surface facing up on the guide 52 having a curved portion, and is conveyed by rotation of a roller 53 An optical sensor 54 installed before the heating position senses the approach of the sample 1, and the temperature of the thermal bar 51 is raised by the sensor signal. The thermal bar 51 is usually operated by remaining heat in order to prevent thermal deterioration of the opposing roller 53. The sample 1 is pushed and heated by the thermal bar 51 while passing through the gap between the curved portion of the guide 52 and the thermal bar 51. A thermocouple senses the temperature of the back surface of the sample 1, and a temperature controller controls the heating temperature. The sample 1 whose barcode surface is heated by the contact with the thermal bar 51 is conveyed toward the infrared emission sensing position by the roller 53. An optical sensor 55 installed before the sensing position senses the passage of the sample 1 and supplies a measurement start signal to a computer. Infrared emission is detected in the cooling process. This infrared emission from the barcode on the sample 1 is guided into the lens barrel of the detecting optical system. The infrared emission intensity as a function of time (convertible into a function of position because the roller rotates at a fixed rate) is input as a file to the computer.

Following the same procedures as in Example 1, smoothing, binarization by differentiation, and width adjustment were performed for the data. The data optimized in the same manner as in Example 1 was decoded by a decoder. Consequently, the decoded data matched the result of decoding of the original data printed on the existing article.

In the apparatus shown in FIG. 17, the rotating speed of the roller 53 can be so changed as to increase the conveyance speed of the sample 1 when the thermal bar 51 heats the sample 1 and decrease the conveyance speed of the sample 1 when the optical system detects infrared emission.

Figure 18:
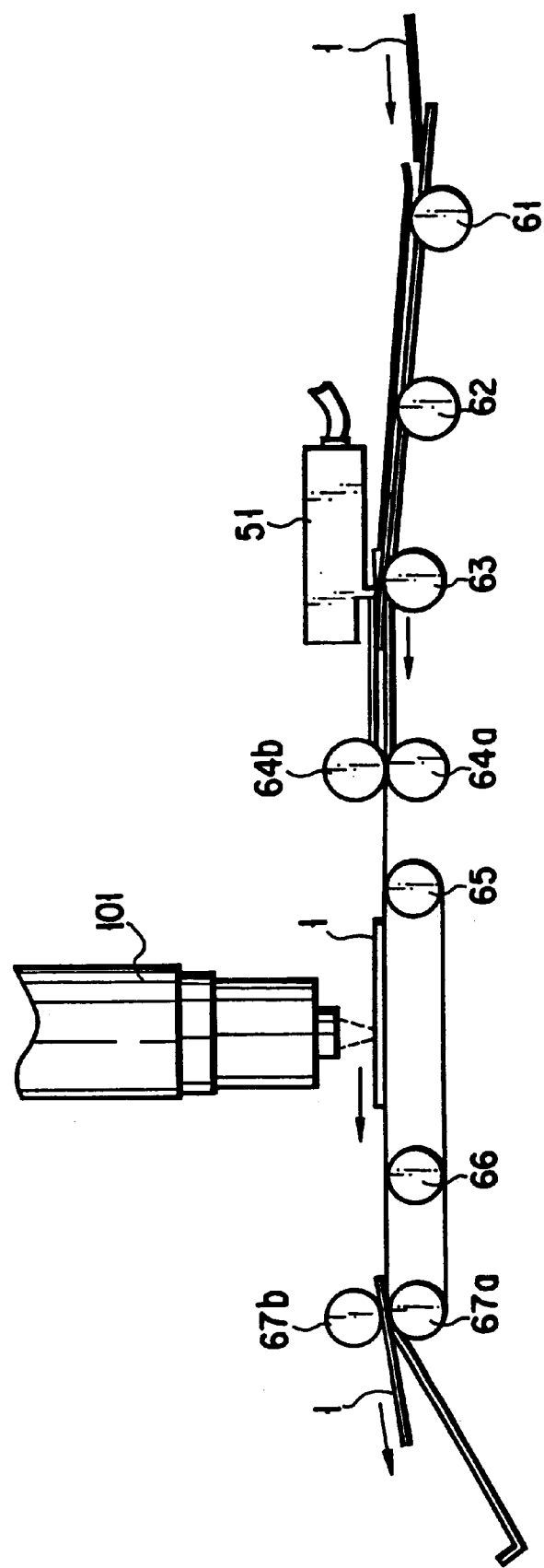
FIG. 18 is a view showing another arrangement of the detecting operation system, heating means, and conveyor means of the invisible symbol reading apparatus of Example 12.

Also, as in an apparatus shown in FIG. 18, a plurality of rollers 61, 62, 63, 64a, 64b, 65, 66, 67a, and 67b can be used. In this apparatus, the rotating speeds of these rollers are changed to increase the conveyance speed of the sample 1 when the thermal bar 51 heats the sample 1 and decrease the conveyance speed of the sample 1 when the optical system detects infrared emission.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for reading an invisible symbol comprising the steps of:
   exciting molecular vibration of an invisible symbol formed on a sample and containing a material which emits infrared light when heated;
   detecting infrared light emitted from the invisible symbol;
   providing a differential coefficient of a detection signal corresponding to a position on the sample;
   determining, based on threshold values set for the differential coefficient, alternating maximum and minimum values of differential coefficients outside said threshold values; and
   binarizing the detection signal by using the maximum or minimum value as a leading or trailing edge of a binary function.

2. The method according to claim 1, wherein the step of detecting infrared light emitted from the invisible symbol is performed in a process of cooling the sample.

3. The method according to claim 1, wherein the invisible symbol is a linear barcode, a basic width of the linear barcode is calculated from the binary function, and the binary function is corrected to an integral multiple of the basic width.

4. The method according to claim 1, wherein the invisible symbol is a linear barcode, a basic width of the linear barcode is calculated by detecting a reference code pattern, and a data character is read on the basis of the calculated basic width.

5. The method according to claim 1, wherein a signal level of an underlying substrate is used as a signal level of background to correct a signal level of the invisible symbol.

6. The method according to claim 1, wherein the invisible symbol is made from a polymer containing a cyano group.

7. The method according to claim 1, wherein the sample is heated to 60 to 100° C.

8. The method according to claim 1, wherein the molecular vibration of the invisible symbol is excited by heating.

9. The method according to claim 1, wherein the molecular vibration of the invisible symbol is excited by light irradiation.

10. An apparatus for reading an invisible symbol comprising:
    a unit configured to excite molecular vibration of a material of the invisible symbol, the invisible symbol formed of a sample and containing a material which emits infrared light when heated;
    a detector configured to detect infrared light emitted from the invisible symbol; and
    an arithmetic operation unit configured to binarize a detection signal from said detector;
    wherein said arithmetic operation unit calculates differential coefficients of the detection signal corresponding to positions on the sample, determines, based on threshold values set for the differential coefficients, alternating maximum and minimum values of the differential coefficient in regions outside the threshold values, and binarizes the detection signal by using the maximum or minimum value as a leading or trailing edge of a binary function.

11. The apparatus according to claim 10, wherein said heater heats the sample is installed in a position apart from said detector, and
    said apparatus further comprises a conveyor configured to move the sample from a heating position of said heater to a detection position of said detector.

12. The apparatus according to claim 10, further comprising a controller configured to turn off said heater before detection by said detector.

13. The apparatus according to claim 10, further comprising:
    an optical modulator configured to optically modulate the infrared light emitted from the invisible symbol; and
    said detector comprising a phase detector configured to detect a phase of a detection signal.

14. The apparatus according to claim 10, further comprising a bandpass infrared filter for transmitting infrared light in a specific wavelength region of the infrared light emitted from the invisible symbol.

15. The apparatus according to claim 13, wherein said bandpass infrared filter transmits infrared light near 4.5 μm peculiar to a cyano group.

16. The apparatus according to claim 10, further comprising a calcium fluoride lens.

17. The apparatus according to claim 10, further comprising a Cassegrain lens.

18. The apparatus according to claim 10, wherein said detector is a mercury cadmium tellurium detector.

19. The apparatus according to claim 10, wherein said detector forms a focal plane array.

20. The apparatus according to claim 19, wherein an element constructing said focal plane array is made of a material selected from the group consisting of platinum silicide and indium antimony.

21. The apparatus according to claim 10, wherein the unit configured to excite molecular vibration of a material of the invisible symbol is a heater.

22. The apparatus according to claim 10, wherein the unit configured to excite molecular vibration of a material of the invisible symbol is a light source.

* * * * *